(12) United States Patent
Kimura

(10) Patent No.: US 11,288,252 B2
(45) Date of Patent: Mar. 29, 2022

(54) TRANSACTIONAL KEY-VALUE STORE

(71) Applicant: HEWLETT PACKARD ENTERPRISE DEVELOPMENT LP, Houston, TX (US)

(72) Inventor: Hideaki Kimura, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 17/079,802

(22) Filed: Oct. 26, 2020

(65) Prior Publication Data

US 2021/0042286 A1 Feb. 11, 2021

Related U.S. Application Data

(62) Division of application No. 15/545,389, filed as application No. PCT/US2015/013602 on Jan. 29, 2015, now Pat. No. 10,846,279.

(51) Int. Cl.
*G06F 7/00* (2006.01)
*G06F 16/23* (2019.01)
(Continued)

(52) U.S. Cl.
CPC ........ *G06F 16/2336* (2019.01); *G06F 3/0619* (2013.01); *G06F 3/0659* (2013.01);
(Continued)

(58) Field of Classification Search
CPC ............. G06F 16/2336; G06F 16/2315; G06F 16/2365; G06F 3/0619; G06F 3/0659; G06F 3/0685; G06F 11/1451; G06F 2201/84
See application file for complete search history.

(56) References Cited

U.S. PATENT DOCUMENTS 8,412,689 B2 4/2013 Reid et al.
8,806,160 B2 * 8/2014 Colgrove ................ G06F 3/067
711/162
(Continued)

FOREIGN PATENT DOCUMENTS

WO 2006/041514 A1 4/2006
WO WO-2006041514 4/2006

OTHER PUBLICATIONS

Eldawy et al., "Trekking Through Siberia: Managing Cold Data in a Memory-Optimized Database", Proceedings of the VLDB Endowment, vol. 7, No. 11, Jul. 2014, pp. 931-942.
(Continued)

*Primary Examiner* — Azam M Cheema
(74) *Attorney, Agent, or Firm* — Hewlett Packard Enterprise Patent Department

(57) ABSTRACT

Example implementations disclosed herein can be used to build, maintain, and access databases built database in multi-core computing systems with large VRAM and huge NVRAM. The database with optimistic concurrency control can be built on a transactional key-value data store that includes logically equivalent data pages stored in both VRAM and VRAM. Data records in volatile data pages in the VRAM represent the most recent version of the data. Data records in the NVRAM immutable and are organized in a stratified composite snapshot. A distributed log gleaner process is used to process log entries corresponding to transactions on the volatile data pages and construct the snapshot. The log gleaner sorts the log entries by epoch, key range, and most recent use to partition the snapshot across multiple nodes.

20 Claims, 23 Drawing Sheets

(51) Int. Cl.
*G06F 3/06* (2006.01)
*G06F 11/14* (2006.01)

(52) U.S. Cl.
CPC ........ *G06F 3/0685* (2013.01); *G06F 11/1451* (2013.01); *G06F 16/2315* (2019.01); *G06F 16/2365* (2019.01); *G06F 2201/84* (2013.01)

(56) References Cited

U.S. PATENT DOCUMENTS

| | | | |
|---|---|---|---|
| 9,442,666 B2* | 9/2016 | Chiu | G06F 3/065 |
| 2006/0116989 A1* | 6/2006 | Bellamkonda | G06F 16/24556 |
| 2008/0155258 A1 | 6/2008 | Obereiner et al. | |
| 2008/0195773 A1 | 8/2008 | Concilio | |
| 2013/0332660 A1* | 12/2013 | Talagala | G06F 12/0246 |
| | | | 711/103 |
| 2014/0156618 A1 | 6/2014 | Castellano | |
| 2014/0172898 A1 | 6/2014 | Aguilera et al. | |
| 2014/0208047 A1 | 7/2014 | Vembu et al. | |
| 2014/0379631 A1 | 12/2014 | Sebastian et al. | |

OTHER PUBLICATIONS

International Search Report and the Written Opinion received for PCT Application No. PCT/US2015/013602 dated Oct. 19, 2015, 19 pages.
Levandoski et al., "The Bw-Tree: A B-tree for New Hardware Platforms," In Data Engineering (ICDE), IEEE 29th International Conference, Apr. 8-12, 2013, 12 pages.
Sadoghi et al., "Reducing Database Locking Contention Through Multi-version Concurrency," Proceedings of the VLDB Endowment, vol. 7, No. 13, Sep. 1-5, 2014, pp. 1331-1342.
Tu et al., "Speedy Transactions in Multicore In-Memory Databases", Proceedings of the Twenty-Fourth ACM Symposium on Operating Systems Principles, Nov. 3-6, 2013, pp. 18-32.
Eldawy, A. et al., "Trekking Through Siberia: Managing Gold Data in a Memory-Optimized Database," Jul. 2014, pp. 931-942.
Levandoski, J. J. et al., "The Bw-Tree: A B-tree for New Hardware Platforms," IEEE, Apr. 8-12, 2013, 12 pages.
Sadoghi, M. et al., "Reducing Database Locking Contention Through Multi-version Concurrency," 2014, 12 pages.

* cited by examiner

TRANSACTIONAL KEY-VALUE STORE

CROSS REFERENCE TO RELATED APPLICATIONS

This application is a divisional of U.S. patent application Ser. No. 15/545,389, filed on Jul. 21, 2017, issued as U.S. Pat. No. 10,846,279, which is a 371 National Stage Entry of PCT/US2015/013602, filed on Jan. 29, 2015, the contents of both are incorporated herein by reference in their entirety.

BACKGROUND

Computing systems with many processor cores are being developed to offer massive amounts of computing power to local and cloud based users. The potential computing power in such multi-core systems can be limited by hardware and software bottlenecks. Limitations related to data transfer between main memory and secondary storage memory and communication among processors have been some of the slowest hardware bottlenecks. For example, in some multi-core systems, the processor cores may have to wait to receive data requested from storage memory or other processors.

As inter-memory data transfer and inter-processor communication speeds increase, software based limitations related to database organization and management started to impose additional limitations that were previously negligible relative to the hardware bottlenecks. Some improvements have been made to increase the operational speeds in various database management techniques. However, such database management systems (DBMS) are too computationally costly to implement in databases in multi-core system with fast access to massive amounts of data resident in secondary non-volatile storage memory where atomicity, consistency, isolation, and durability (ACID) properties for transactions are required.

DETAILED DESCRIPTION

Overview

Figure 1:
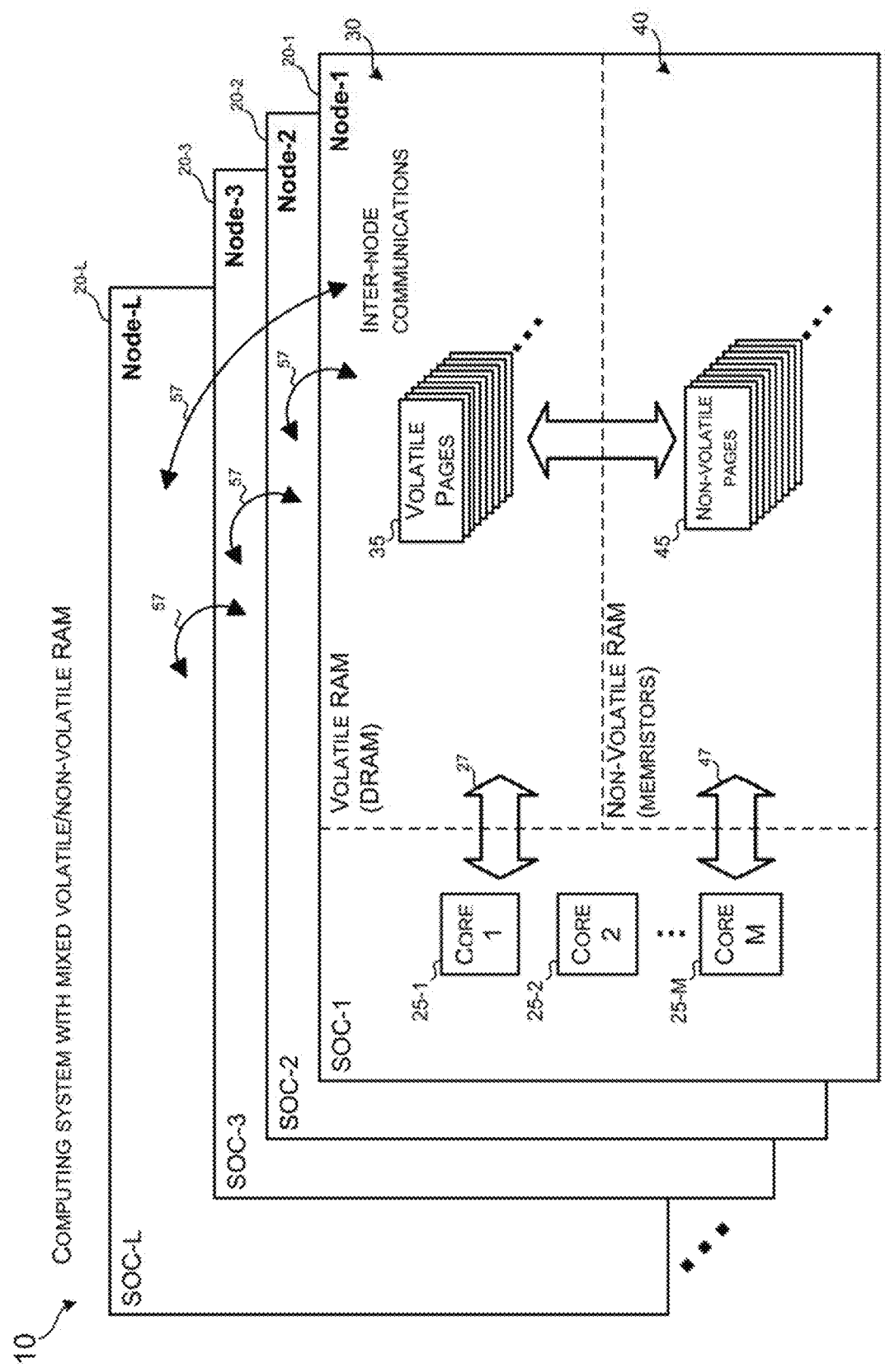
FIG. 1 is a schemata diagram of a multi-core computing system in which examples of the present disclosure can be implemented.

The present disclosure describes a framework for creating, using, and maintaining transactional key-value data stores in multiprocessor computing systems (e.g., server computers). Such transactional key-value data stores can have all or some of the data simultaneously resident in a primary volatile random access memory (VRAM) and a secondary non-volatile random access memory (NVRAM). Various aspects of the present disclosure can be used individually or in combination with one another to provide ACID compliant key-value data stores that scale up for use in databases resident in computing systems with many processing cores (e.g., on the order of thousands), large VRAMs, and huge NVRAMs.

Database systems implemented according to the methods, systems, and frameworks illustrated by the examples described herein can reduce or eliminate much of the computational overhead associated with some key-value stores and database management systems. Illustrative examples demonstrate how to utilize the capacity for many concurrent transactions inherently possible in multi-core computing systems. In some examples, the multiple cores, VRAM, and NVRAM of the computing system can be distributed across multiple interconnected nodes. Multiple cores can be integrated into a system-on-chip (SoC). Accordingly, implementations of the present disclosure can provide the functionality for multiple cores in multiple SoCs to execute many concurrent transactions on data in the data pages stored in the distributed VRAM and NVRAM arrays without a central concurrency controller. However, although examples presented herein are described in the context of computing systems that use SoCs in multiple nodes, various aspects of the present disclosure can also be implemented using other computer system architectures.

Some implementations include databases in which data, including metadata or index data, can be stored in fixed size data pages. A data page can include a key or a range of keys. The data pages can be associated with one another through one or more dual pointers. For example, each key or range of keys can be associated with a dual pointer that includes indications or addresses of physical locations of the corresponding data pages containing the data record in the data pages in VRAM and the NVRAM. The data pages in the VRAM and the NVRAM can be organized according to various data structures, as illustrated by the example data structures described herein. In some scenarios, it is possible for a particular data record to be contained in a volatile data page in the VRAM and in a logically equivalent snapshot data page in the NVRAM.

The duality of the data in VRAM and NVRAM can provide for various mechanisms to keep frequently used, or otherwise desirable, data, in VRAM and readily available to the processing cores. By keeping commonly used data in VRAM, potentially slow transactions that include updates, changes, or deletions of data records in the secondary storage in NVRAM can be reduced or eliminated. Changes to the data records in in the volatile data pages be logged and later be committed to the snapshot pages in a distributed log gleaner process separated from the execution of the transaction to help avoid software and hardware bottlenecks.

In related implementations, a computationally lightweight cache of snapshot pages can be maintained in the VRAM to provide fast, nearly wait-free, access for read-only transactions. In such implementations, read-only transactions that are directed toward records not already contained in the volatile data pages, can cause the system to copy the corresponding snapshot data page to the snapshot cache. To avoid potential cache misses and other errors, the snapshot cache can occasionally include multiple copies of the snapshot data pages without violating correctness in the database. The cached snapshot data pages can be kept in the VRAM for a predetermined amount of time after its most recent read. Accordingly, commonly read snapshot data pages can be kept in the snapshot cache to avoid potentially slower reads of the data pages from NVRAM.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, physical network, virtual network, and/or organizational changes can be made without departing from the scope of the present disclosure.

Multi-Core Computing Systems

Examples of the present disclosure, and various improvements provided thereby, am described in the context of multiple processor core, otherwise referred to herein as "multi-core", computing systems that include large arrays of volatile and nonvolatile random access memory (VRAM and NVRAM). Described herein are techniques for systems, methods, and data structures that can be used to implement key-value stores and corresponding databases that can improve the performance of such multi-core computing systems.

Example multi-core computing systems can include server systems equipped with hundreds to thousands of cores resident in multiple SoCs in multiple nodes. As illustrated in FIG. 1, systems like computing system 10 can include vast arrays of VRAM 30 distributed across the nodes 20. The computational cost of maintaining coherent memory-caches in VRAM 30 can limit the number of processor cores 25 that can operate effectively on a uniform memory-access region. Accordingly, some multi-core systems may have only two to eight interconnected sockets for processor cores.

Like in-memory databases, examples of the present disclosure can store data in the VRAM 30, such as static random access memory (SRAM), or dynamic random access memory (DRAM), and like disk-based databases, even more data can be stored in NVRAM 40 (e.g., memristors, phase change memory, spin transfer torque, etc.). However, unlike disk-based databases, NVRAM 40 can be significantly faster than hard disks, and with some NVRAM devices, can approach the performance of the VRAM. As the name of the storage type suggests, data stored in VRAM 30 and NVRAM 40 can be accessed in any random order, thus offering significant improvements to the speed of writes and reads compared to disk-based computing systems that are limited by sequential seek techniques and speed at which the physical disk spins. In addition, because random access memory is byte addressable, it can offer various performance advantages over hard disk and flash memory that use block addressing.

Several example implementations described herein, can be implemented in and enhance the capabilities of a computing system similar to multi-core computing system 10 illustrated in FIG. 1. As shown, computing system 10 can include multiple interconnected nodes 20. As used herein, the term "node" is used to refer to any device, such as an integrated circuit (IC). node board, mother board, or other device, that integrates all or some of the components of a computer or other electronic system into a single device, substrate, or circuit board. Accordingly, in various examples, a node 20 can include multiple individual processor cores or multi-core system-on-chips (SoCs) disposed on and interconnected with one another through a circuit board (e.g., a node board or a mother board). In such implementations, an SoC can include digital, analog, and mixed-signal logic functionality all on a single chip substrate. SoCs are common in high volume computing systems because of their low power consumption, low cost and small size. VRAM 30 and/or NVRAM 40 can be included in a node 20 as corresponding devices connected to a circuit board.

The inter-node communication connections 57 between nodes 20 can include various electronic and photonic communication protocols and media for relaying data, commands, and requests from one node 20 to another node 20. For example, a particular core 25-1 in node 20-1 can request data stored in volatile data pages 35 in VRAM 30 or nonvolatile data pages 45 in NVRAM 40 of another nods 20-2.

As described herein, example computing system 10 can include any number L (where L is a natural number) of nodes 20. For example, so increase the number of cores 25 and the size of the available volatile and nonvolatile memory provided by VRAM 30 and NVRAM 40, multiple nodes 20 can be combined into computing system 10. Each node 20 can include any number M, (where M is a natural number) of cores 25, an array of VRAM 30, and an array of NVRAM 40. The cores 25 can access the volatile data pages 35 and the nonvolatile pages 45 through corresponding VRAM interface 27 and NVRAM interface 47.

VRAM interface 27 and NVRAM interface 47 can include functionality for addressing the physical location of a particular volatile data page 35 or nonvolatile page 45 in the corresponding VRAM 30 or NVRAM 40. In one example implementation, the VRAM interface 27 and the NVRAM interface 47 can include or access metadata that includes the physical address of the root pages of a particular storage targeted by a transaction. Once the root page of a particular storage is determined, a particular data page containing a data record associated with a key can be found using a data structure by which the storage is organized. Examples of data structures that can take advantage of the various operational capabilities of computing system 10 are described herein.

Various examples of the present disclosure can be used alone and in combination to provide a database management systems (DBMS) that enable enhanced transactional functionality on databases stored in systems surds as computing system 10. Such databases can be built on and include key value stores that include mechanisms for utilizing the advanced performance characteristics of multi-processor computing system 10 with hybrid memories that include both VRAM 30 and NVRAM 40.

VRAM and NVRAM

VRAM 30 random access memory, such as dynamic random access memory (DRAM) and static random access memory (SRAM), maintains data only when periodically or actively powered. In contrast, NVRAM 40 is random access memory that can retain its information even when not powered.

The capacity of VRAM 30 (e.g., DRAM) devices has increased exponentially over the years, it is, or will soon be, possible to have servers have extremely large arrays of VRAM 30 for main memory. In some scenarios, it is possible to include hundreds of terabytes or more. However, VRAM 30 is becoming increasingly difficult and expensive to scale to smaller feature sizes. To address the limitations of large VRAM 30 arrays, implementations of the present disclosure use advancements in NVRAM 40.

New forms of NVRAM 40 are being developed that can perform well enough to be used as universal memory. Some NVRAM 40, such as phase-change memory (PCM), spin transfer torque magnetic random access memory (STT-MRAM), and memristors, offer performance close to or equal to that of DRAM or SRAM devices, but with the non-volatility of flash memory.

Examples of the present disclosure include performance improvements by using the emerging NVRAM 40 technologies as the non-volatile data store. Many of the emerging NVRAM 40 technologies may perform orders of magnitude faster than current non-volatile devices, such as SSD. However, bandwidth and latency performance of NVRAM can vary from device to device due to process and material variations. Accordingly, emerging NVRAM 40 technologies are stilt expected to have higher latency than VRAM 30, such as DRAM. For example, a PCM product may have 5 to 30 μs read latency and 100 μs write latency.

Emerging NVRAM 40 technologies are also expected to have finite endurance. Depending on the type of NVRAM 40 cell (e.g., single level or multi-level cell) and the material used, NVRAM 40 endurance can be orders of magnitude lower than VRAM 30.

Such characteristics and limitations of emerging NVRAM 40 technologies are addressed in various implementations of the present disclosure. For example, operations in multi-core system 10 may need to account for highly non-uniform memory-access (NUMA) costs. The multiple architectures in some example, whether a database is incoherent or not it can place data so that most accesses to VRAM 30 and NVRAM 40 are node 20 local. The term "NUMA aware" is used to refer to the capability to address cache-incoherent architectures in NUMA systems.

Databases implemented using example transactional key-value stores described herein can avoid contentious communications among the cores 25, the nodes 20, the VRAM 30, and NVRAM 40. The massive number of cores 25 can benefit from the reduction or elimination of all contentious communications.

Databases built according to the present disclosure can make use of NVRAM 40 for data sets too large to fit in VRAM 30. However, because VRAM 30 can often have faster access (e.g., read or write) times, various implementations can use VRAM 30 to store so-called "hot data" that is frequently accessed. In contrast, so-called "cold data" that is accessed less frequently can be moved in and out of NVRAM 40 as needed without undue decrease in performance. In addition, when data is written to NVRAM 40, examples of the present disclosure reduce the number of writes to a fewer number of sequential writes so that the performance and the endurance of NVRAM 40 can be increased.

Database Management System Overview

Figure 2A:
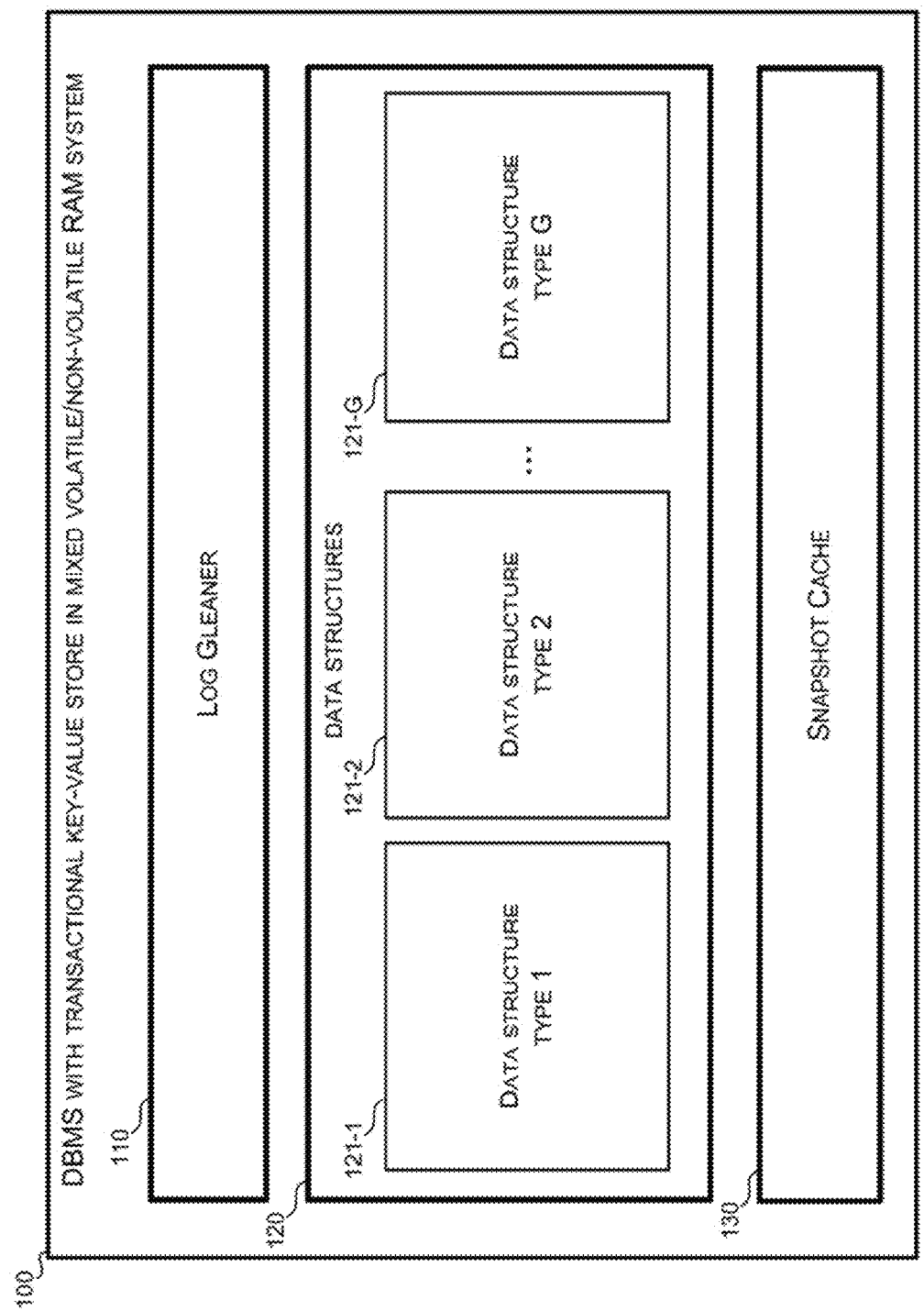
FIG. 2A illustrates an example database management system.

FIG. 2A illustrates a schematic view of a DBMS 100 in a mixed volatile/nonvolatile RAM system in accordance with various example implementations of the present disclosure. As shown the DBMS 100 can include various component processes or functionality, such as log gleaner 110, data structures 120, and/or a snapshot cache 130. As described herein, such component processes or functionality can be implemented as a combination of software, firmware, and/or hardware in a computer system, such as computer system 10. For example, a DBMS 100 can be implemented as computer executable code stored in a volatile or nonvolatile memory. The DBMS 100, and any of its component functionality, can be embodied as computer executable code that include instructions, that when executed by a processor in a computing system, cause a processor to be configured to perform the functionality described herein.

In a multi-processor computing system with large VRAM 30 and NVRAM 40, such as system 10, computational and memory resources can be shared among the nodes 20 through the inter-node connections 57. Accordingly, components of me DBMS 100, as well as analytical and transactional operations, can be performed by multiple processing cores 25 on data in VRAM 30, and/or NVRAM 40 in multiple nodes 20.

The functionality of log gleaner 110, data structures 120, and a snapshot cache 130 can be distributed across multiple nodes 20. As such, the functionality of each one of the components of the DBMS 100, while described herein as discrete modules, can be the result of the various processing cores 2,. VRAM 30, and NVRAM 40, of the multiple nodes 20 in the system 10 performing dependent or independent operations that in the composite achieve the functionality of the DBMS 100.

Example implementations of the DBMS 100 described herein can be used to build databases that can more fully exploit the capabilities of multi-processor computing systems with large VRAM 30 and NVRAM 40 arrays, such as system 10. Such databases can be fully ACID compliant and scalable to thousands of processing cores 25. Databases implemented in accordance with the examples of the present disclosure improve the utilization of the VRAM 30 and NVRAM 40 and allow for a mix of write-intensive online transaction processing (OLTP) transactions and big-data online analytical processing (OLAP) queries. To achieve such functionality, various databases according to the present disclosure use a lightweight optimistic concurrency control (OCC).

Using various implementations of OCC described herein, a database can maintain data pages in both the NVRAM 40 and the VRAM 30 without global metadata to track where records are cached. Instead of global metadata, databases can be built using variations of DBMS 100 that can maintain physically independent, but logically equivalent, copies of each data page in VRAM 30 and NVRAM 40. The copies of the data pages resident in both VRAM 30 and NVRAM 40 provide a duality in the data useful for improving the functionality of a database implemented in a multi-core computing system 10. On one side of the data page duality, are mutable volatile data pages 35 in VRAM 30. On the other side, are immutable non-volatile data pages 45, also referred to herein as snapshot data pages, 45 in NVRAM 40.

The DBMS 100 can construct a set of snapshot data pages 45 from logical transaction logs of the transactions executed on the volatile data pages 35, rather than the volatile data pages 35 themselves. In some implementations, it is the collective functionality described at the log gleaner 110 that constructs the snapshot data pages 45 independently of and/or in parallel to the transactions executed or the volatile data pages 35. In such implementations, the log gleaner 110 can sequentially write snapshot data pages 45 to NVRAM 40 to improve the input-output performance and endurance of NVRAM 40. Such functionality can maintain data in two or more separate structures, each of which is optimized for respective underlying storage medium.

The data can be synchronized between the two structures in batches. For example, a simple version of an LSM tree can include a two-level LSM tree. The two-level LSM tree can include two tree-like structures, where one is smaller and entirely residents in VRAM, whereas the other is larger and resident on disk. New records can be inserted into the memory-residents tree. If the insertion causes the memory resident free to exceed a predetermined size threshold, the contiguous segment of entries is removed from the memory resident tree and merged into the disk resident tree. The performance characteristics of the LSM trees stem from the fact that each of the tree components is tuned to the characteristics of its underlying storage medium, and that data is officially migrated across media in rolling batches, using an method similar to a merge sort.

In contrast, log gleaner 110 can use stratified snapshots that mirror each volatile data page in a single snapshot data page in a hierarchical fashion. The term "stratified snapshot" refers to a data structure in NVRAM 40 in which only data pages that are affected by a particular transaction are changed. As such, when a volatile data page 35 is dropped to save VRAM 30 consumption, serializable transactions can read a single snapshot data page to determine if the requested record exists and/or retrieve the requested record.

The log gleaner 110 can include functionality for collecting tog entries corresponding to the serializable transactions executed on data records contained in volatile data pages 35 in VRAM 30 by the many cores 25. The log gleaner 110 can then sort and organize the collected log entries according to various characteristics associated with the log entries, such as time of execution, key range, and the like. The sorted and organized log entries can then be committed to the snapshot pages 45 in NVRAM 40. As described herein, the log gleaner process 110 can include component processes distributed across multiple nodes 20. Example implementations of the log gleaner 110 are described in additional detail herein in reference to FIG. 6.

The structures 120 used by the DBMS 100 can be specifically tuned for various purposes and operation within NVRAM 40. Accordingly, DBMS 100 can include multiple data structure types 121.

The snapshot cache 130 can include a lightweight and wait free buffer pool of immutable snapshot pages for read-only transactions. As described herein, the snapshot cache 130 can be distributed among the NVRAM 40 of multiple nodes 20 or be local to a single node 20. In one example implementation, a node 20 can include a snapshot cache 130 that includes a snapshot pages most recently read by transactions executed by the cores 25 in that node 20. Additional details of the functionality and capabilities of the snapshot cache 130 are described herein.

Figure 2B:
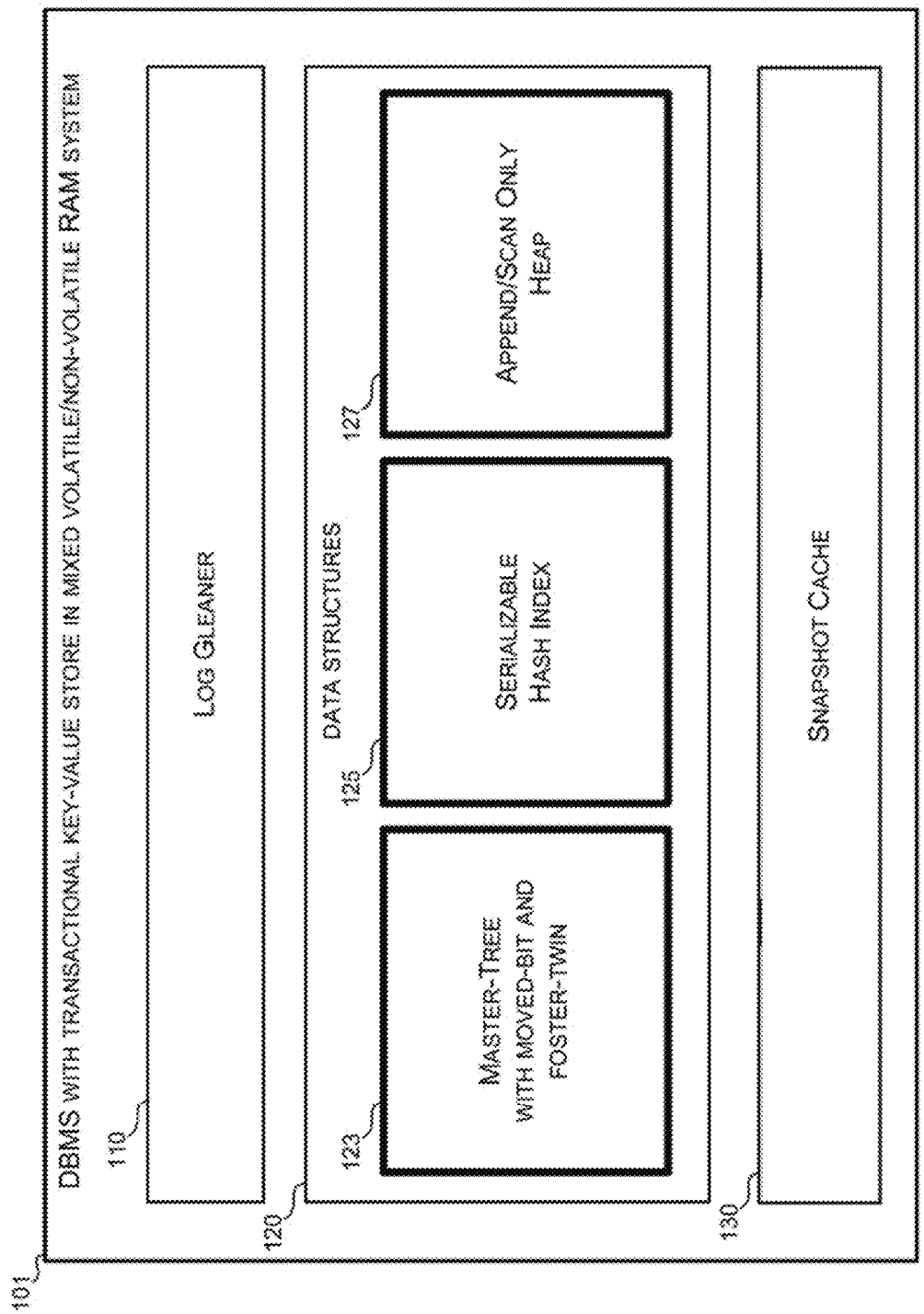
FIG. 2B illustrates another example database management system with specific example data structures.

FIG. 2B depicts an example DBMS 101 according to various implementations of the present disclosure. DBMS 101, like example DBMS 100, can include a log gleaner 110 and a snapshot cache 130. In addition, DBMS 101 can include data structures 120 that include specific data structure types according to various implementations of the present disclosure. Specifically, DBMS 101 can include a master-tree data structure 123 with moved-bits and foster-twins, serializable hash index data structure 125, and the append/scan only heap data structure 127. As described, each of the master-tree data type 123, serializable hash index data structure 125, and the append/scan only heap data structure 127 have attributes that make them suitable for various types of use cases. Details of the specific example data structures 120 are described in additional detail herein in reference to illustrative example implementations and use cases.

Dual Data Pages and Dual Pointers

Figure 3:
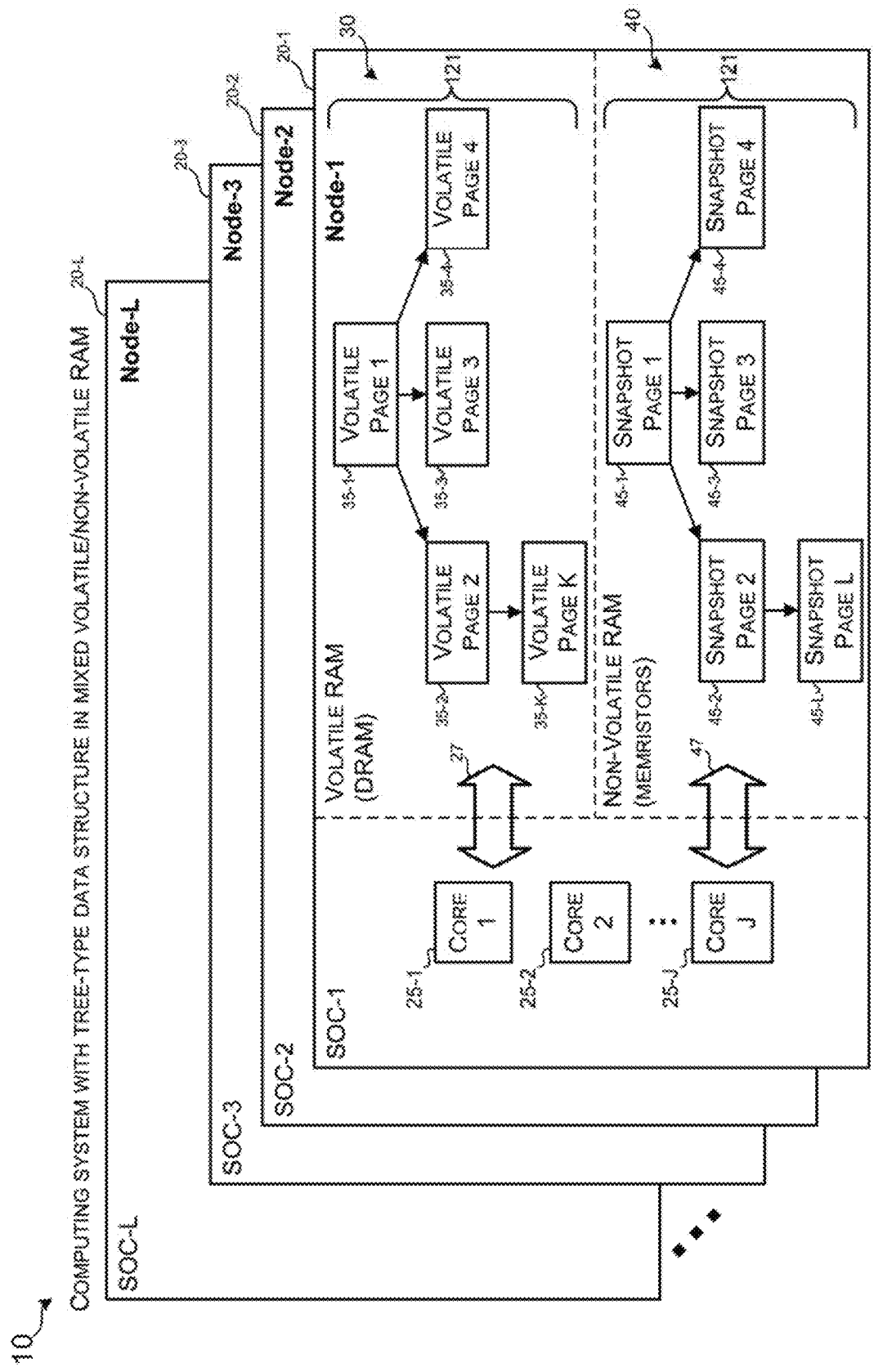
FIG. 3 depicts an example database management system in a multi-core multi-node computing system using a generalized tree data structure.

FIG. 3 is a schematic of a DBMS in computing system 10 that illustrates the duality of the of the volatile data pages 35 and the snapshot pages 45 in VRAM 30 and NVRAM 40 distributed across multiple nodes 20, according to various implementations of the present disclosure. While any of the cores 25 in any of the nodes 20 can access the VRAM 30 and NVRAM 40 on any of the nodes 20, for the sake of clarity, the characteristics and functionality of the volatile data pages 35 and the snapshot pages 45 are described in the context of a tree-type data structure 121 in a single node 20-1. This example is illustrative only and is not intended to limit data structures 121 from being distributed across multiple nodes.

Any of die cores 25 can execute a transaction on a data record in a particular volatile data page 35 or snapshot page 45. Execution of the transaction can include various operations, such as reads, writes, updates, deletions, and the like, on a data record associated with a particular key in a particular storage. As used herein, the term "storage" can refer to any collection of data pages organized according to a particular data structure. For example, the storage can include collection of data pages organized in a tree-type hierarchy in which each data page is a node associated with other node data pages by corresponding edges. In the implementations described herein, the edges that connect data pages can include pointers from a parent data page to a child data page. In some examples, each data page, except for the root page, can have at most one incoming pointer from a parent data page and one or more outgoing pointers indicating child data pages. Each pointer can be associated with a key or range of keys.

Using the key, the transaction can find the root page of the storage using the VRAM interface 27 or the NVRAM interface 47. Once the root page, such as volatile data page 35-1 or snapshot page 45-1 in the example shown, is found, the executing core 25 can search the data structure type 121 for the data page that includes the key. The search for the key can include traversing the hierarchy of data pages to find the data page associated with a key.

In examples described herein, each data page, including the root data pages, can include dual pointers that include indications or addresses of the physical location of child pages. In one implementation, each dual pointer can point to a corresponding child volatile data page 35 in VRAM 30 or a corresponding child snapshot page 45 in NVRAM 40. As such, the pointers in the pair of dual pointers can also include physical addresses of the corresponding data pages in a particular node 20. Accordingly, the volatile pointer in the dual pointers can point to the volatile data page 35 resident in one node 20, such as node 20-2, white the snapshot pointer can point to a corresponding snapshot page 45 in another node 20, such as node 20-3.

Figure 4:
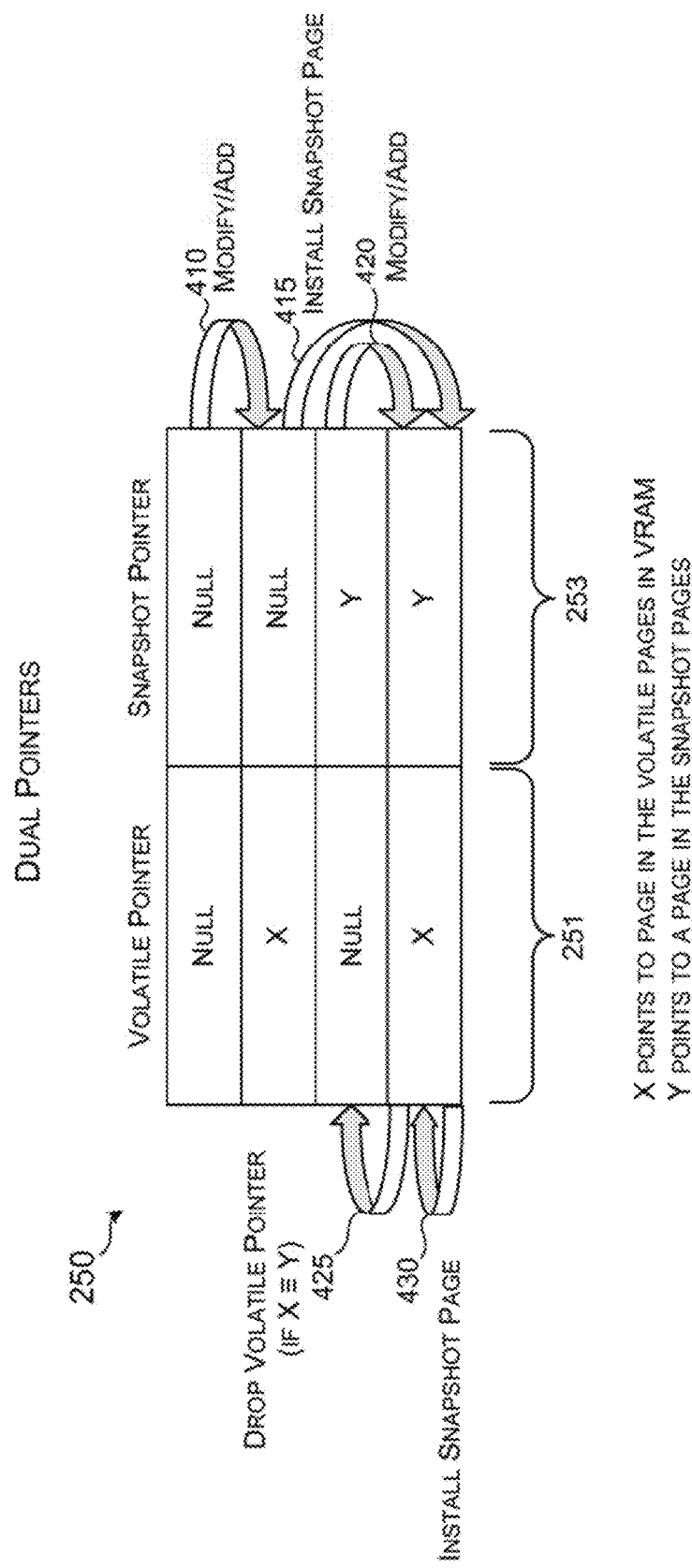
FIG. 4 illustrates an example dual in-page pointer structure.

FIG. 4 depicts an example dual pointers 250 that can be associated with a particular key and/or included in a data page in example scenarios. Each dual pointer can include a value for a volatile pointer 251 and/or a value for the snapshot pointer 253. In one example, both the volatile pointer 251 and the snapshot pointer 253 can both be null. Under such circumstances, the DBMS 100 can determine that the neither a volatile data page 35 nor a snapshot page 45 exists that is associated with a particular key. Accordingly, the DBMS 100 can perform modify/add operation 410 to create or install a volatile data page 35 that is associated with the key. Part of creating or installing the volatile data page 35 can include updating the volatile pointer 251 in the parent volatile data page 35 indicating the physical location, "X", of the newly installed volatile data page 35 in the VRAM 30.

When the snapshot page 45 corresponding to volatile data page 35 is created in the NVRAM 40, the DBMS 100 can update the snapshot pointer 253 to include the physical location, "Y" of the corresponding snapshot page 45 in NVRAM 40, with an install snapshot page operation 415. If the volatile data page 35 is not accessed for some period of time and the snapshot page 45 is equivalent to the volatile data page 35 (e.g. each of the pages contain the same version of the data), then the volatile data pages 35 can be dropped from volatile memory 30 to conserve volatile memory space. The volatile pointer 251 pointing to the ejected volatile data page 35 can be updated as "NULL", in operation 425.

In cases in which a transaction on a particular key includes a modify/add type operation finds a dual pointer 250 in which the volatile pointer 251 is "NULL" and the snapshot pointer 253 is a valid physical location in the NVRAM 40, then the DBMS 100 can install a copy of the snapshot page 45 into VRAM 30 as a volatile data page 35. At this point, the DBMS 100 can update the volatile pointer to indicate the physical location, "X", of the newly installed volatile data page 35, in operation 420. If the transaction changes or modifies volatile data page 35, then the DBMS 100 can log the transaction to install the corresponding snapshot page, in operation 430.

Figure 5:
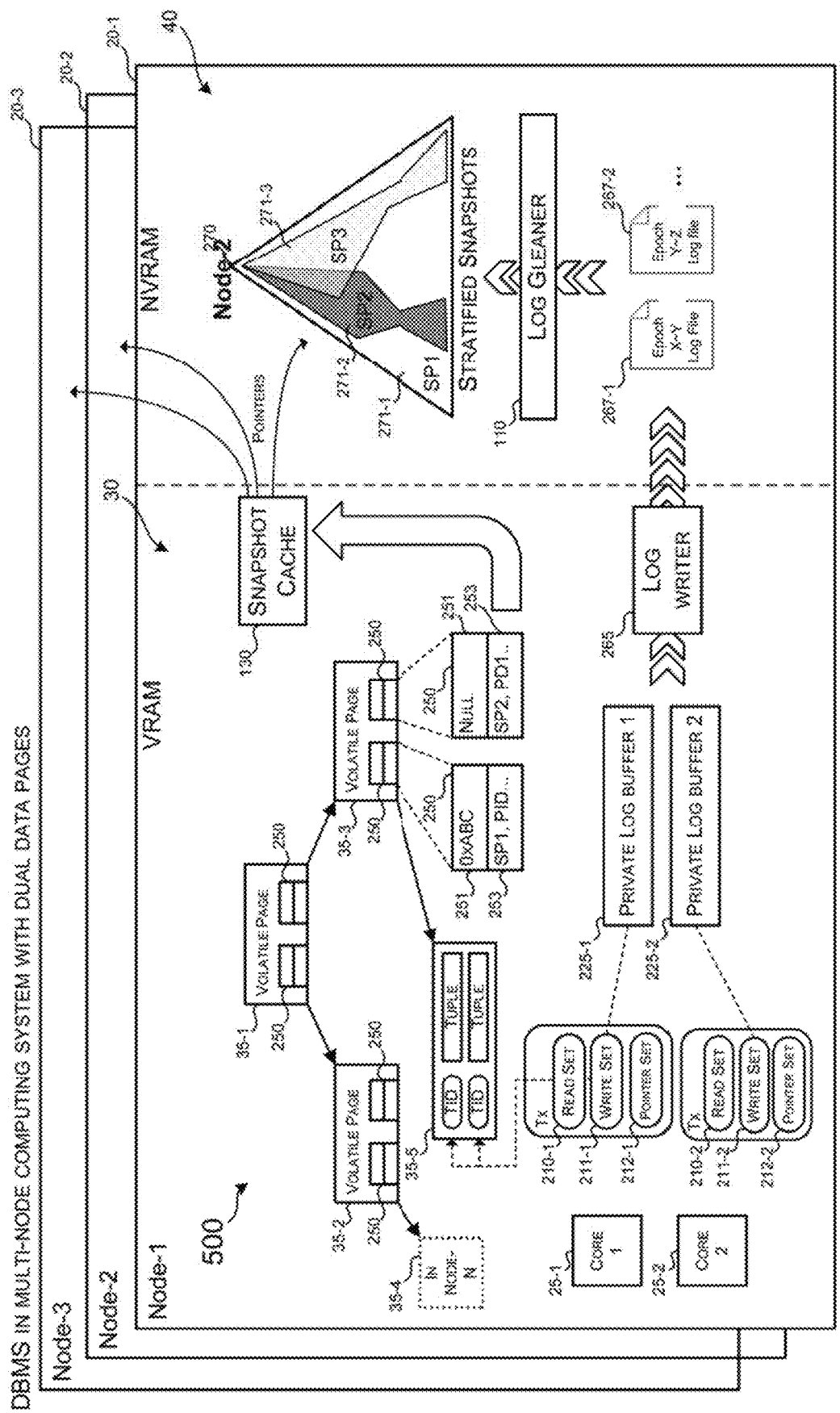
FIG. 5 depicts an example database management system that includes distributed fogging to build and maintain data in snapshot data pages in non-volatile random access memory (NVRAM) corresponding to data in volatile data pages in volatile random access memory (VRAM).

In various examples, the DBMS 100 can store and maintain all data in a database in a transactional key-value data store with fixed size data pages with versions resident in VRAM 30 and/or NVRAM 40. In such implementations, a transactional key-value data store according to the present disclosure can also include most if not all metadata regarding the structure and organization of the database in the data pages. FIG. 5 illustrates one example implementation in which a version of the volatile data pages 35 can be mirrored in the stratified snapshot 270. As described herein, the stratified snapshot can include multiple layers of non-volatile, or snapshot, data pages 45.

In such implementations, the dual nature of the volatile data pages 35 in the VRAM 30 and the corresponding snapshot data pages 45 in NVRAM 40 becomes salient and useful. As described, a data page can include a dual pointer 250 that can point to the physical location of other data pages. In one example, a dual pointer 250 can point to a pair of logically equivalent data pages, in which one of the pair is in VRAM 30 and the other is in NVRAM 40.

As described in reference to FIG. 4, a dual pointer 250 can include two associated pointers. One of the two pointers can include an address or other indication of the physical location of a volatile data page 35 in the VRAM 30, and the other of the two pointers can include an address or other indication of the physical location of a corresponding or associated snapshot data page 45 in the NVRAM 40. Each of the dual pointers 250 can also include a status indicator or other metadata. The status indicator and other metadata is described in reference to the specific types of data structures 120.

The pairs of the volatile data pages 35 and snapshot data pages 45, while associated by dual pointers 250, are physically independent. Thus a transaction that modifies the volatile data page 35 of the pair does not interfere with a process that updates the snapshot data page 45 of the pair. Similarly, the process that updates the snapshot data page 45 does not affect the corresponding existing volatile data page 35. The duality and mutual independence of the data pages allows for higher degree of scalability that would cause software and hardware bottlenecks in some databases.

Various implementations of the transaction key-value data store maintain no out-of-page information. Accordingly, a key-value store of the present disclosure can maintain the status and other metadata associated with the data pages without a separate memory region for record bodies, mapping tables, a central lock manager, and the like. With all the information associated with, included in, and describing the data stored in the actual data pages can provide for highly scalable data management in which contentious communications are restricted to data page level and the footprint of the contention is are proportional to the size of the data in VRAM 30 and not in the size of the data in the NVRAM 40. For example, in one potential scenario in which terabytes of data is stored in the NVRAM 40, the transactional key-value store of the present disclosure can use a single dual pointer in the VRAM 30 (e.g., DRAM) to the root data page of the data in the NVRAM 40. This can be contrasted with in-memory and in-disk database management system that would need large amounts of metadata stored in VRAM 30 to find and access the data in secondary persistent storage medium (e.g., hard disks, flash memory, etc.).

By storing all data in the data pages, implementations of the present disclosure can reduce or eliminate the need for garbage collection processes to reclaim storage space from deleted data pages. Reclamation of the storage space can also occur without compaction or migration. By avoiding garbage collection, compaction, and migration, example key-value stores can save a significant amount of computational overhead.

Such key-value stores according to the present disclosure can immediately reclaim the storage space of data pages when they are no longer needed and use it in other contexts because all the data pages can have a fixed and uniform size. Such configurations of the data pages can also help avoid potential cache misses and remote node 20 access because the record data is always in the data pages.

Key-value stores according to various implementations of the present disclosure can be used to build and maintain multi-version databases with lightweight OCC to coordinate concurrent transactions. Such a databases can be built and maintained by a correspondingly implemented database management system or "DBMS" that can respond to requests to execute transactions on two sets of data pages that are lazily synced using logical transaction logs. As described herein, a transaction key-value store of example DBMS 100 can store all data in fixed size volatile data pages 35 and snapshot data pages 45. For example, all of the volatile data pages 35 and the snapshot data pages 45 can be 4 KB data pages.

As described herein, the volatile data pages 35 in VRAM 30 can represent the most recent versions of the data in a database and the non-volatile, or snapshot, data pages 45 in NVRAM 40 can include historical snapshots of the data in the database. In some scenarios, the records in the snapshot data pages 45 may be the most current version given there has been no recent modification to the volatile data pages 35. As will be described in additional detail below in reference to FIGS. 5 and 6, the so-called "snapshot data pages", can be compiled based on log entries corresponding to transactions executed on the data in the volatile data pages 35.

In reference to FIG. 5, DBMS 100 can execute a transaction using a particular core 25 to perform an operation on a data record, or tuple, associated with a particular key. To find the data record associated with the key, the DBMS 100 can first find the root page of a particular target storage 500 associated with the key. Finding the root page of a target storage 500 can include referencing a metadata file stored in VRAM 30 or NVRAM 40 with a listing of storages with corresponding pointers to the physical location of the root pages of the storages. In some examples, the root pages listed in the metadata file can be associated with a range of keys. Accordingly, a particular storage can be found by determining if the key is within a range of a particular root page. For example, for a target key "13", if a first root page is associated with keys 1 through 1000, and a second root page is associated with keys 1001 through 2000, the target key will most likely be found in the storage associated with the first root page.

In the example shown in FIG. 5, volatile data page 35-1 is the root page of the storage 500 in VRAM 30. As described herein, the root page 35-1 can be associated with a range of keys that includes the target key of a particular transaction. The root volatile data pages 35-1 can include dual pointers 250. In various implementations, each volatile data page 35 can include two outgoing dual pointers 250. Each one of the two outgoing dual pointers 250 can be associated with half of the range of keys associated with volatile data page 35 that contains them. In the example shown, the first half of the key range of volatile data page 35-1 is associated with a dual pointer 250 that includes a volatile pointer to child volatile data page 35-2. The second half of the key range of volatile data page 35-1 is associated with a dual pointer 250 that includes a volatile pointer to child volatile data page 35-2. Each one of the child volatile data pages 35-2 and 35-3 can also include dual pointers 250 to child pages.

As illustrated, volatile data page 35-2 can include a dual pointer 250 that points to a volatile data page 35-4 resident in another node other than node 20-1. Volatile data page 35-3 can include a dual pointer 250 that includes a volatile pointer 251 and a snapshot pointer 253. In the particular example shown, one half of the key range associated with the volatile data page 35-3 is associated with a dual pointer 250 that points to volatile data pages 35-5 that contains the tuple associated with the target key of the transaction. The first dual pointer 250 of the volatile data page 35-3 can also include a pointer to the snapshot page 45 that contains the tuple associated with the target key.

Volatile data page 35-3 can also include a second dual pointer 250 that points to data pages associated with the second half of the key range. As shown, the second dual pointer 250 can include a "NULL" volatile pointer 251 indicating that the key does not exist in VRAM 30. Rather, the snapshot pointer 253 indicates that the key is found in the snapshot cache 130 or in the stratified snapshot 270. In some examples, the snapshot pointer 253 can include a partition identifier and a page identifier that contains the key in the stratified snapshots 270 (e.g., partition identifier "PD1", and snapshot page identifier "SD1").

For transactions that include read-only operations, the snapshot pointer 253 can point to a copy of the snapshot page in the snapshot cache 130. For transactions that might update, insert, or delete a tuple associated with the key, a copy of the snapshot page associated with the snapshot pointer 253 can be installed in the volatile data pages 35 and the volatile pointer 251 of the dual pointer 250 of the parent volatile data page 35 can be updated with its physical address in VRAM 30. As used herein, the terms "record" and "tuple" are used interchangeably to refer to the value or values associated with a particular key in a key-value pair.

In various implementations described herein, each transaction is executed by a particular core 25. To avoid conflicts between concurrent transactions, implementations according the present disclosure use a form of concurrency control that does not require a centralized concurrency controller. Instead, DBMS 100 can use a form of optimistic concurrency control that can use in-page locks during a pre-commit or commit phases of the transaction Implementations that use optimistic concurrency control can greatly reduce the computational overhead and increase the scalability of various implementations described herein.

Optimistic Concurrency Control

Examples of the present disclosure can use optimistic concurrency control (OCC) to avoid contentious data accesses resulting from concurrent transactions being executed on the sane data records at the same time. In various examples, execution of an "OCC" transaction can track the records it reads and writes in local storages using corresponding read-sets 210, write-sets 211, and pointer-sets 212.

The read-set 210 can include the current transaction identifiers (TIDs) of the tuples that a particular transaction will access. Accordingly, once a transaction finds a particular tuple associated with a key, the DMBS 100 can record the current TID associated with the tuple in a transaction specific read-set 210. The transaction can then generate a new or updated tuple that will be associated with a key. The DBMS 100 can then associate the new or updated tuple with 3 new TID to indicate that a change has been made to the tuple associated with the key and track it in a corresponding write-set 211. In some implementations. TID's can include a monotonically increasing counter that indicates the version of the tuple and/or the transaction that created or modified it. The write-set 211 can include many tuples associated with corresponding TIDs.

In a validation phase, DBMS 100 can verify that a tuple associated with the key has not been altered by a concurrent transaction since the tuple was read. The verification can include comparing the TID in the read-set 210 with the current TID associated with the tuple. If the TID remains unchanged, the DBMS 100 can assume that the tuple has not been changed by another transaction since the tuple was initially read from the corresponding data page. If the TID has changed, the DBMS 100 can infer that the tuple has been altered.

At commit time, after validating that no concurrent transaction writes overlap with its read-set, execution of the transaction can install all tuples in the write-set 211 in a batch. If validation fails, execution of the transaction can abort, if execution of the transaction is aborted, the DBMS 100 can reattempt the transaction at a later time.

This approach has several benefits for scalability. OCC transactions may only write to shared memory during the commit phase of the transaction, which can occur after completion of the compute phase of the transaction execution. Because writes can be limited to the commit phase of the transaction, the write period relative to the rest of the transaction can be short, thus reducing the chance of contentious writes.

Based on the use of the validation phase, tuples, and the data pages. In which they reside, need not be locked except during writes. This can reduce the number of read locks on tuples that could otherwise induce undue contention just to read data. Excessive read locks can introduce software bottlenecks that can limit scalability. As such, various characteristics of OCC can help improve the scalability of key-value stores implemented in multi-processor systems 10 with large VRAM 30 and NVRAM 40 that have the potential of running many concurrent transactions on the same tuple.

Once a transaction has been committed, a log entry that includes information about the transaction can be placed into a private log buffer 225 specific to the core 25 executing the transaction. A log writer process 265 can then generate log files 267. Each log file 267 can include some number of log entries corresponding to committed transactions performed during particular time periods, or "epochs".

One example of OCC according to the present disclosure can include a pre-commit procedure that concludes a transaction with a verification of serializability without a verification of durability. OCC can verify durability for batches of transactions by having the log writer 265 occasionally pushing transaction log entries from the private log buffers 225 to epoch log files 267 for each epoch. Each epoch log file 267 can organize the included transaction log entries by a course-grained timestamp.

Example 1 summarizes an example pre-commit protocol use in volatile pages 35 and snapshot pages 270, according to various implementations of OCC.

EXAMPLE 1

---

Input: R: Read-set, W: Write-set, N: Node set
/* Precommit-lock-phase */
Sort W by unique order;
    foreach w ∈ W do Lock w;
Fences, get commit epoch;
/* Precommit-verify-phase */
    foreach r; observed ∈ R do if r:tid ≠ observed and r
∈ W then abort;
foreach n; observed ∈ N do if n:version ≠ observed
then abort;
Generate TID, apply W, and publish log;

---

According to the pre-commit protocol illustrated in Example 1, the DBMS 100 can lock all records included in the write-set 211, "W". The concurrency control scheme can include an in-page lock mechanism for each locked record. For example, the in-page lock mechanism can include an 8-byte TID for each record that can be locked and unlocked using atomic operations without a central lock manager. Placing a lock mechanism in-page avoids the high computational overhead and physical contention of central lock managers used in main-memory database systems. By avoiding the high computational and physical contention, concurrency control with in-page lock mechanisms described herein scale better to multi-processor systems with many more processor cores (e.g., orders of magnitude larger) than the concurrency control used by main-memory databases.

In such example implementations, after the DBMS 100 locks all records in the volatile page 35 included in the write-set 211, it can verify the status of the records in the mad-set by checking the current TIDs of the locked records after the epoch of the transactions is finalized. In some implementations, verifying the read-set 210 can include initiating a memory fence to enforce an ordering constraint on memory operations issued before and after the memory fence instructions. In some implementations, this means that operations issued prior to the memory fence are guaranteed to be performed before operations issued after the barrier.

If the DBMS 100 can verify that there has been no change to the TID of the corresponding record in the volatile data page 35 since the read-set was taken (e.g., verify that no other transactions have changed the TIDs since the corresponding record was read), then it can determine that the transaction is serializable. The DBS 100 can then apply the changes indicated in the private log buffer to the locked records and overwrite the existing TIDs with a newly generated TIDs corresponding to the transaction that caused the changes. The committed transaction logs can then be published to a private log buffer 225 and then a log writer 266. A log writer 265 can write committed transaction logs to a corresponding log file 267 for durability. Such decentralized logging can be based on coarse-grained epochs to eliminate contentious communications.

Another aspect of OCC schemes of the present disclosure aims to reduce synchronous communications for reads. Because read operations happen more often than writes, even in OLTP databases, minimization of such synchronous communication can help avoid contentious data access and unnecessary locks on data records and data pages. In various examples, the DBMS 100 can ameliorate the issue of aborts resulting from changes to TIDs that cannot be verified by use of specific data structures (e.g., "Master-Tree") that include mechanism (e.g., moved or changed hits) described in additional detail in reference to figures and operations corresponding to the particular data structures.

Some implementations of OCC can include mechanisms for tracking "anti-dependencies" (e.g., write-after read conflicts). For example, in one scenario, a transaction t1 can read a tuple from the database, and a concurrent transaction can then overwrite the value of the tuple read by t1. The DBMS can order t1 before t2 even after a potential crash and recovery from persistent logs. To achieve this ordering, most systems require that t1 communicate with t2, usually by posting a corresponding read-set to shared memory or using a centrally-assigned, monotonically-increasing transaction ID. Some non-serializable systems can avoid this communication, but they suffer from anomalies like snapshot isolation's "write skew". Example implementations of the present disclosure can provide serializability while avoiding all shared memory writes for read transactions. The commit protocol in the OCC can use memory fences to produce scalable results consistent with a serial order. Correct recovery can be achieved using a form of epoch-based group commit to the stratified snapshot 270 implemented by the log gleaner process 110.

In such implementations, time can be divided into a series of short epochs. Even though transaction results can always agree with a serial order, the system does not explicitly know the serial order except across epoch boundaries. For example, if t1 occurs in an epoch before the epoch in which t2 is executed, then t1 precedes t2 in the serial order. For example, the log writer 265 can log transactions in units of whole epochs and release results at epoch boundaries as individual epoch log files 267.

As a result, various implementations can provide the same guarantees as any serializable database without unnecessary scaling bottlenecks or additional latency. The epochs used to help ensure serializability can be used in other aspects of the present disclosure to achieve other improvements. For example, epochs can be used to provide database snapshots that long-lived read-only transactions can use to reduce aborts. This and other epoch based mechanisms are described in additional detail herein.

Distributed Log Gleaner Process

As described herein, log entries corresponding to transactions executed on data in the volatile data pages 35 can be stored in private log buffers 225 and/or files specific to each node 20, SoC, or core 25. In such implementations, to take advantage of the high speed execution of transactions on data in VRAM 30, various implementations separate the construction of the stratified snapshot 270 from the execution of the transactions.

In one example implementation, the construction of the stratified snapshot 270 can be distributed among the cores 25 and/or the nodes 20. Such construction can include distributed logging, mapping, and reducing to systematically glean and organize the many concurrent transactions executed by the many processing cores 25 on the volatile data pages 35 to ensure serializability of the data in the corresponding snapshot data pages 45 in NVRAM 40.

Figure 6A:
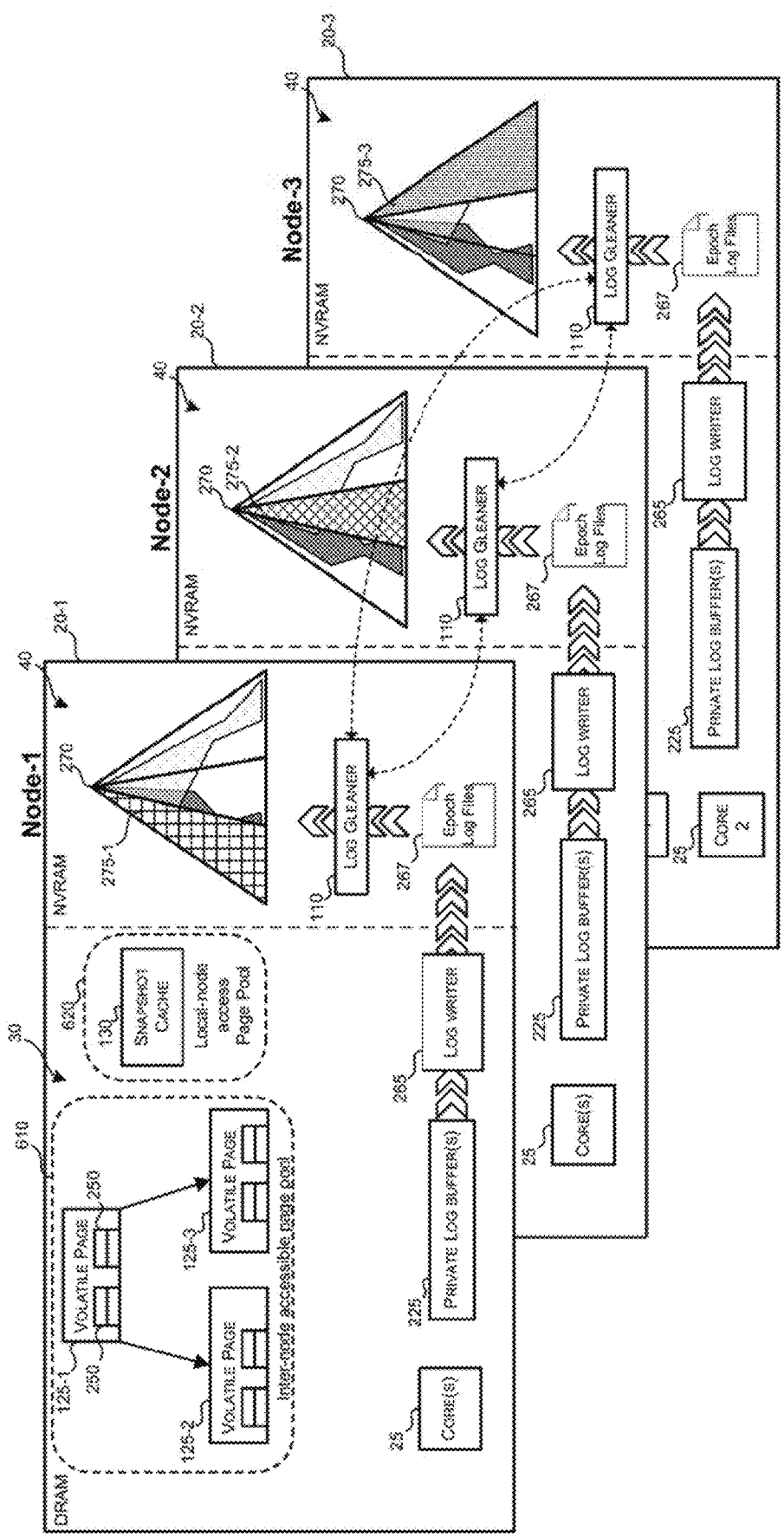
FIG. 6A depicts an example database management system with a distributed log gleaner process and partitioned snapshot data pages in NVRAM.

FIG. 6A illustrates an overview of the construction of the stratified snapshot 270. The construction of the stratified snapshot 270 in the NVRAM 40 can be based on SoC or node specific epoch log files 267 corresponding to the transactions performed by the cores 25 in the corresponding nodes 20 on data records in the volatile data pages 35 of the inter-node accessible page pool 610. In some implementations, the epoch log files 267 are generated by log writer processes 265 in the corresponding nodes 20. Each epoch log file 267 can correspond to a particular epoch (e.g., a particular time period). The epochs can be uniformly defined across nodes 20 such that each log writer 265 can generate an epoch log file 267 for each epoch such that the start times and/or the stop times are consistent across all epoch log files 267. The log gleaner process 110 can then organize operations based on the epochs to ensure serializability of the transactions corresponding to the log entries when generating the stratified snapshot 270.

Pointer Sets

As described herein, concurrency control techniques used in various implementations can be optimistic and can handle scenarios in which volatile data pages 35 are occasionally evicted from VRAM 30. That is, when a volatile data page 35 has not been accessed for some period, as measured by time or number of transactions, then it can be deleted from memory to free up space in the VRAM 30 for more actively used data pages. In addition, the DBMS 100 can also drop a volatile data page 35 from VRAM 30 when it determines that the volatile data page 35 and the corresponding snapshot data pages 45 are physically identical to one another.

Once a volatile data page 35 is dropped from the VRAM 30, subsequent transactions may only see the read only snapshot data page 45. Unless a transaction modifies a data record in the snapshot data page 45, there is no need to create a volatile data page version of the snapshot data page 45. If the transaction involves a modification to a data record in the snapshot data page 45, then the DBMS 100 can create or install a volatile data page 35 in VRAM 30 based on the latest snapshot data page 45 in NVRAM 40. However, this can violate serializability when other concurrent transactions have already read the same snapshot data page 45.

To detect the installation of new volatile data pages 35, each transaction can maintain a pointer-set 212 in addition to the read-set 210 and write-set 211. Whenever a core 25 executing a serializable transaction follows a dual pointer 250 to a snapshot data page 45 because there was no volatile data page 35 (e.g., the volatile pointer was NULL), it can add the physical address of the volatile data page 35 to the pointer-set 212 so that it can perform a verification of the tuple in the volatile data page 35 during a precommit process and abort the transaction if there has been a change to the tuple. The verification can use mechanisms of the master-tree data structure described in more detail herein.

For illustration purposes, the pointer-set 212 can be described as being analogous to a node-set (e.g., data page version set in some in-memory DBMS). However, the pointer-set 212 serves a different purpose. In in-memory DBMS, the purpose of the node-set is to validate data page contents, whereas implementations of the present disclosure can use the pointer-set to verify existence of the volatile data page 35 in NVRAM 40 in-memory DBMS do not verify the existence of new volatile data pages 35 because all the data is assume to always be in the mam memory. Examples of the present disclosure protect the contents of volatile data pages 35 with mechanisms included in specific data structures described herein.

Various implementations according to the present disclosure can reduce inter mode communications. To that end, a DBMS 100 can include two VRAM 30 resident data page pools. One of the data page pools can include the volatile data pages 35 and the other for caching snapshot data pages 45, Both data page buffer pools are allocated locally in individual nodes 20. In some examples, nodes 20 can access the volatile data page buffer pools in other nodes 20. However, snapshot data page pool or cache 130 can be restricted to allow only the local SoC access to minimize remote-node accesses.

Because snapshot data pages 45 are immutable, the snapshot data page cache 130 can include several properties that distinguish it from other buffer pools. For example, when a core requests a data page that has already been buffered, it is acceptable if occasionally the data page is re-read and a duplicate image of the data page added to the volatile data page buffer pool. In most scenarios, this duplication of an occasional data page does not violate correctness, nor does it impact performance. In addition, the buffered image of a snapshot data page in the snap data page cache does not need to be unique. It is not an issue if the volatile data page buffer pool occasionally contains multiple images of a given data page. The occasional extra copies waste only a negligible amount of VRAM 30, and the performance gains achieved by exploiting relaxed requirements on the DBMS can be significant. These and other aspects of the snapshot cache 130 are described in more detail herein.

Stratified Snapshots

As used herein, the term "stratified snapshot" refers to any data structure that can store an arbitrary number of images or copies of the data added to or changed in volatile data pages 35 in VRAM 30 in response to transactions committed during corresponding time periods, or epochs. Stratified snapshots 270 can be used in various example implementations to achieve various computational, communication, and storage efficiencies in the organization of data stored in NVRAM 40. In particular, stratified snapshots 270 can be used to store to and retrieve data records from snapshot data pages 45 stored in NVRAM 40 with reduced computational overhead by avoiding complex searches, reads, and writes in data pages in NVRAM 40.

In some implementations, the snapshot data pages 45 in the stratified snapshots 270 are created by the log gleaner described herein. To avoid the computational resource expense associated with generating a new image of the entire database when the snapshot data pages 45 are updated, the log gleaner can replace only the modified parts of the database. For example, to change a record in a particular snapshot data page 45, the tog gleaner process may insert a new data page that includes the new version of the record. To incorporate the new data page into the snapshot data pages 45, the pointers of the related data pages can be updated. For example, the pointers of ancestor data pages (e.g., parent data pages of the replaced data page) are updated to point to the new data page and new pointers are written to the new data page to point to the child data pages of the data page the new data page replaced. In such implementations, the log gleaner can output a snapshot that is a single image of all of all the data stored in a particular storage.

In such implementations, DBMS 100 can combine multiple snapshots to form a stratified snapshot. As described herein, newer snapshots overwrite some or alt of older snapshots. Each snapshot can include a complete path through the hierarchy of data pages for every record in every epoch up to the time of the snapshot. For example, the root data page of a modified storage is always included in the snapshot, and in some cases the only change from the previous snapshot is a change to one pointer that points to a lower level data page in the hierarchy of snapshot data pages 45. The pointers in tower levels of the snapshot point to the previous snapshot's data pages. One benefit of such implementations is that a transaction can read a single version of the stratified snapshot to read a record or a range of records. This characteristics is helpful in scenarios in which the existence of a key must be determined quickly, such as in OLTP databases (e.g., inserting records into a table that has primary key, or reading a range of keys as a more problematic case). Databases that use primitive tree structures, such as log-structured-merge trees (LSM-Trees), approaches may be required to traverse several trees or maintain various Bloom Filters for to ensure serializability. The computational and storage overhead in such databases is proportional to the amount of cold data in secondary storage (e.g., hard-disk, flash memory, memristors, etc.), and not the amount of hot data in the primary storage (e.g., main memory, DRAM, SRAM, etc.).

As described herein, the log gleaner process can include coordinated operations performed by many cores in many nodes 20. However, for the sake of simplicity the log gleaner is described as a single component of functionality implemented as a combination of hardware, software, and/or firmware in a multi-core system to with large arrays of VRAM 30 and huge arrays of NVRAM 40.

Figure 6B:
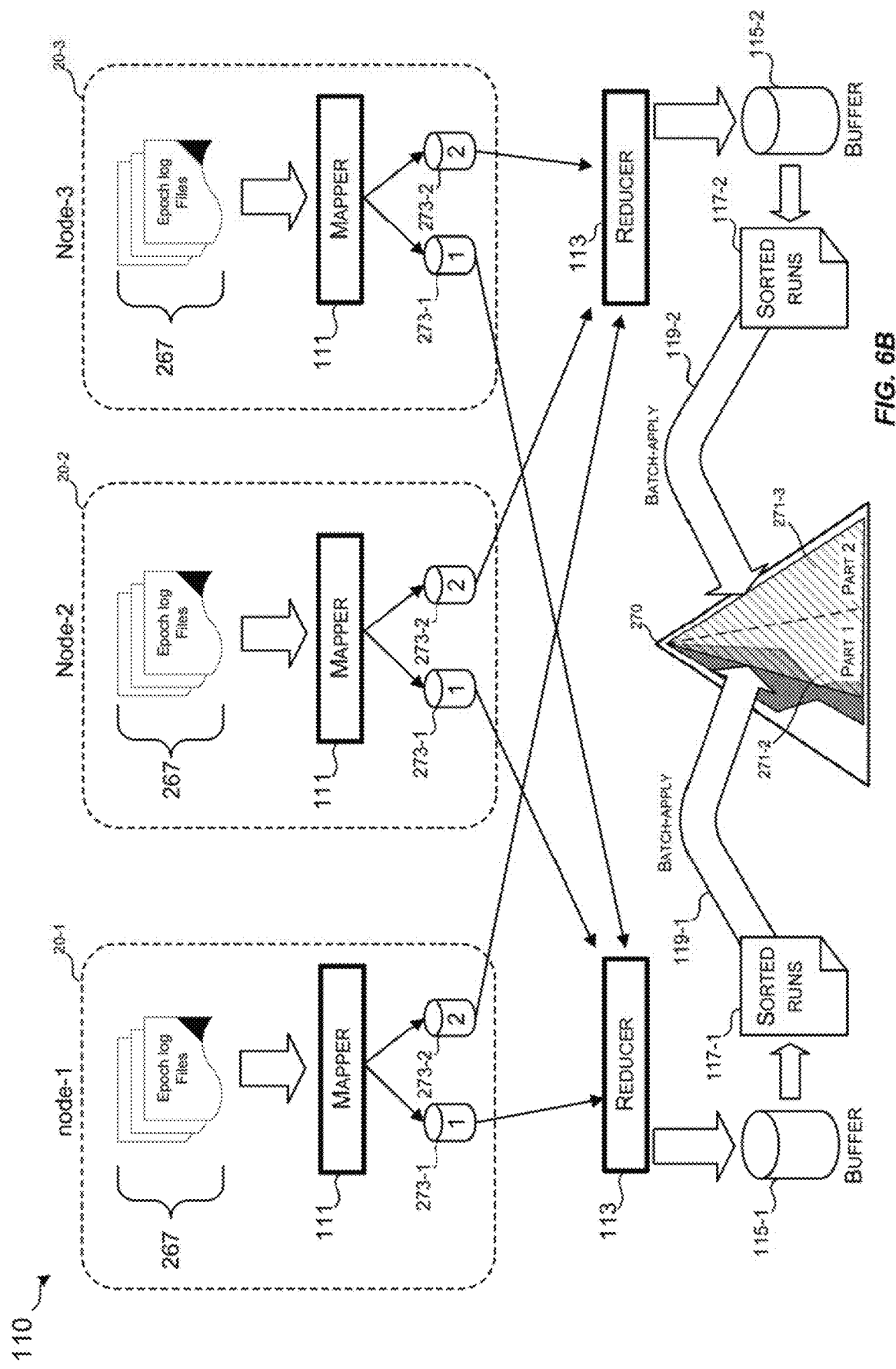
FIG. 6B depicts the mapper and reducer processes of an example distributed log gleaner process for generating partitioned snapshot data pages 45.

FIG. 6B depicts an example data flow of the inter-node log gleaner process 110. As shown, each node 20 can generate the epoch log files 267. While only three nodes 20 are shown, operations of these three nodes 20 are illustrative of the inter-node log gleaner processes 110 that include many more nodes 20.

Once the epoch log files 267 are generated and stored in the NVRAM 40, the next stage of log gleaner process 110 can include running mapper 111 and reducer 113 processes. As shown in FIG. 6B, the mapper process 111 can be performed in each one of the nodes 20. In such implementations, the mapper process 111 can read entries from log files 267 associated with a particular epoch. For example, the mapper process 111 can read all of the log entries for a specific period of time (e.g., the last 10 seconds). The mapper process 111 can also separate the log entries into buckets 273. Each bucket 273 can contain a log entries for a particular storage (e.g., a particular collection of data pages organized according to a particular data structure types). Separating the log entries into corresponding buckets 273 can include buffering log entries into buffers corresponding to storages in the NVRAM 40. For example, the buckets 273-1 can be associated with a table of customer information and the buckets 273-2 can be associated with database for enterprise wise financial transactions.

Once a bucket 273 for a particular storage is full, the reducer process 113 can sort and partition the log entries in the bucket based on the boundary keys for the storage determined by the mapper 111. The reducer process 113 can send the partitioned log entries to the partitions 271 of the partitioned stratified snapshot 270 per bucket.

In some examples, the partitions 271 can be determined based on which nodes 20 last accessed specific snapshot data pages 45 271. To track which node 20 performed the last access, the DBMS 100 can insert a node or SoC identifier in the snapshot data pages 45. By capturing the locality of the partitions, the mapper processes 111 can send most log entries to a reducer 113 in the same node 20. In such implementations, the mapper 111 can send the log entries to the reducer's buffer 115.

Sending the log entries to the buffer 115 can include a three-step concurrent copying mechanism. The mapper 113 can first reserve space in the reducer's buffer 115 by atomically modifying the state of the reducer's buffer 115. The mapper process 111 can then copy the entire bucket 273 into the reserved space in a single write operation. Using a single write operation to copy all the log entries in the buffer 115 can be more efficient than performing multiple write operations to write each log entry in the log individually. In some implementations, multiple mappers 111 can copy buckets 273 of multiple log entries to corresponding buffers 115 in parallel (e.g., multiple mappers 111 can copy log entries to the same buffer 273 concurrently). Such copying processes can improve performance of writes in a local node 20 and in remote nodes 20 because such copying can be one of the most resource intensive operations in DBMS operations. Finally, the mapper 111 can atomically modify the state of reducer's buffer 115 to announce the completion of the copying. For example, the mapper 111 can change a flag bit to indicate that a copy to the reserved buffer space has been populated.

Once the log entries are placed in the appropriate log reducer buffer 115, the log reducer 113 can construct snapshot data pages 45 in batches. A reducer can maintain two buffers. One buffer 115 for the current batch and another buffer for the previous batch 117. A mapper 113 can write to the current batch buffer 115 until it is full, as described above. When the current batch is full, the reducer 113 can atomically swap the current and previous batches 115 and 117. In some implementations, the reducer 113 can then wait until all mappers 111 complete their copy processes.

While mappers 111 copy to the new current batch buffer, the reducer can dump the log entries in the previous batch buffer to a file. Before dumping the log entries into the file, the reducer can sort the log entries by storages, keys, and serialization order (e.g., epoch order and in-epoch ordinals). The sorted tog entries are also referred to as "sorted-runs".

Once all mappers 111 are finished, each reducer 113 can perform a merge-sort operation on the current batch buffer in VRAM 30, the dumped sorted-runs 117, and previous snapshot data pages 45 if the key ranges overlap. This can result in streams of log entries sorted by storages, keys, and then serialization order, which can be efficiently applied to the snapshot 270. For example, the streams of log entries can be added to the stratified snapshot pages 270 in batch-apply processes 119.

The term "map" is used herein to refer to higher-order functions that apply a given function to each element of a list, and returns a list of results. It is often called apply-to-all when considered in functional form. Accordingly, the term "mapper" refers to a process or module in a computer system that can apply a function to some number of elements (e.g., log entries in a log file 267).

"Reduce" is term used herein to refer to a family of higher-order functions that analyze a recursive data structure and recombine through use of a given combining operation the results of recursively processing its constituent parts, building up a return value. A reducer process, or a reducer, called by combining a function, a top node of a data structure, and possibly some default values to be used under certain conditions. The reducer can then combine elements of the data structure's hierarchy, using the function in a systematic way.

Figure 6C:
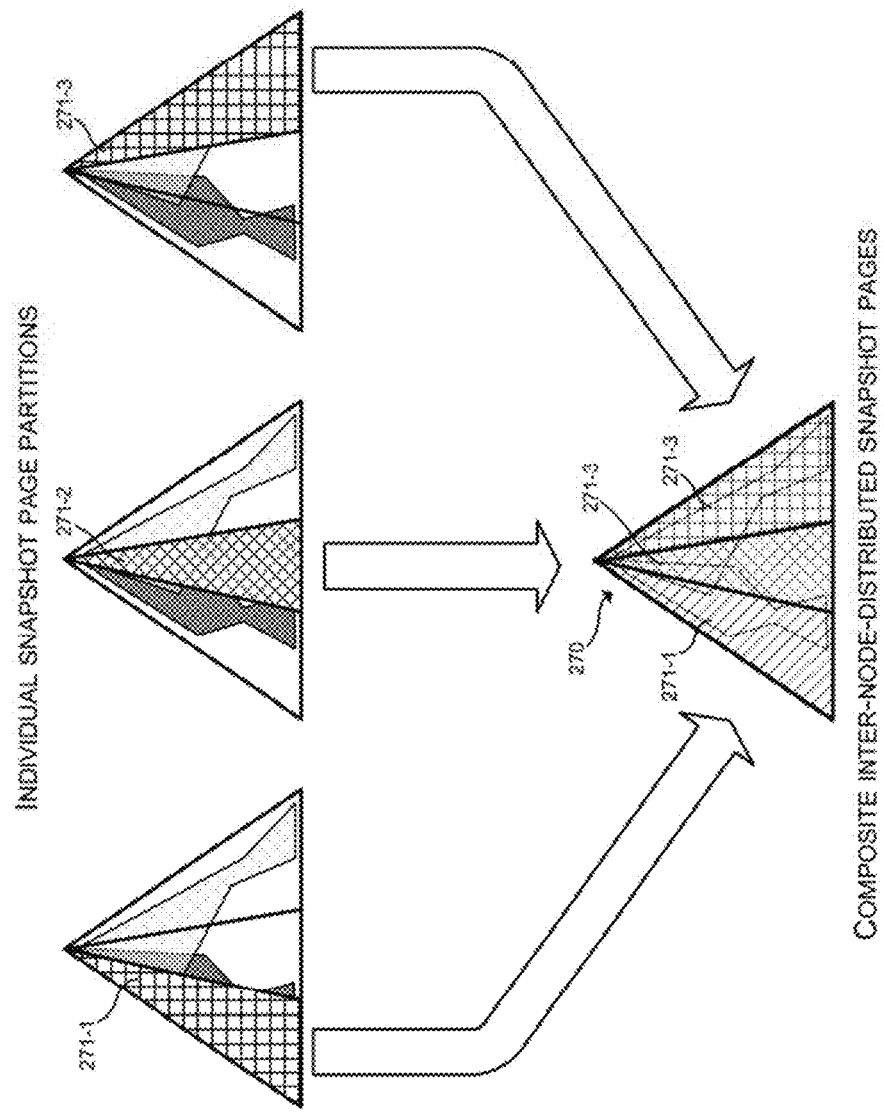
FIG. 6C illustrates example pardoned snapshot data pages.

FIG. 6C depicts a visual representation of how the node specific partitions 271 of the stratified snapshot pages are combined to create a composite inter-node snapshot 270. For example, partitions 271-1,271-2, and 271-3 can be resident in the NVRAMs 40 of corresponding nodes 20. The various partitions 271 can be linked to one another through appropriate single and dual pointers 250. Such pointers can include the physical address in the VRAM 30 or NVRAM 40 in local and remote nodes 20.

Partitioning the stratified snapshot 270 across nodes 20 can shrink storage sizes and help avoid the expense of managing fine-grained locks Partitioning can be effective when the query load matches the partitioning (e.g., cores 25 access partitions of the stratified snapshot 270 resident on the same node 20).

Use of snapshot data pages 45 can avoid writing a complete new version of the key-value store or database. Instead, the DBMS can makes changes only to snapshot data pages 45 with records or pointers that are changed by corresponding transactions on the volatile data pages 35. As such, the snapshot 270 in the NVRAM 40 can be represented by a composite, or a stratified compilation, of snapshot pages 45 in which the changes to the non-volatile data can be represented by changes to the dual pointers 250 and their corresponding keys.

Figure 7A:
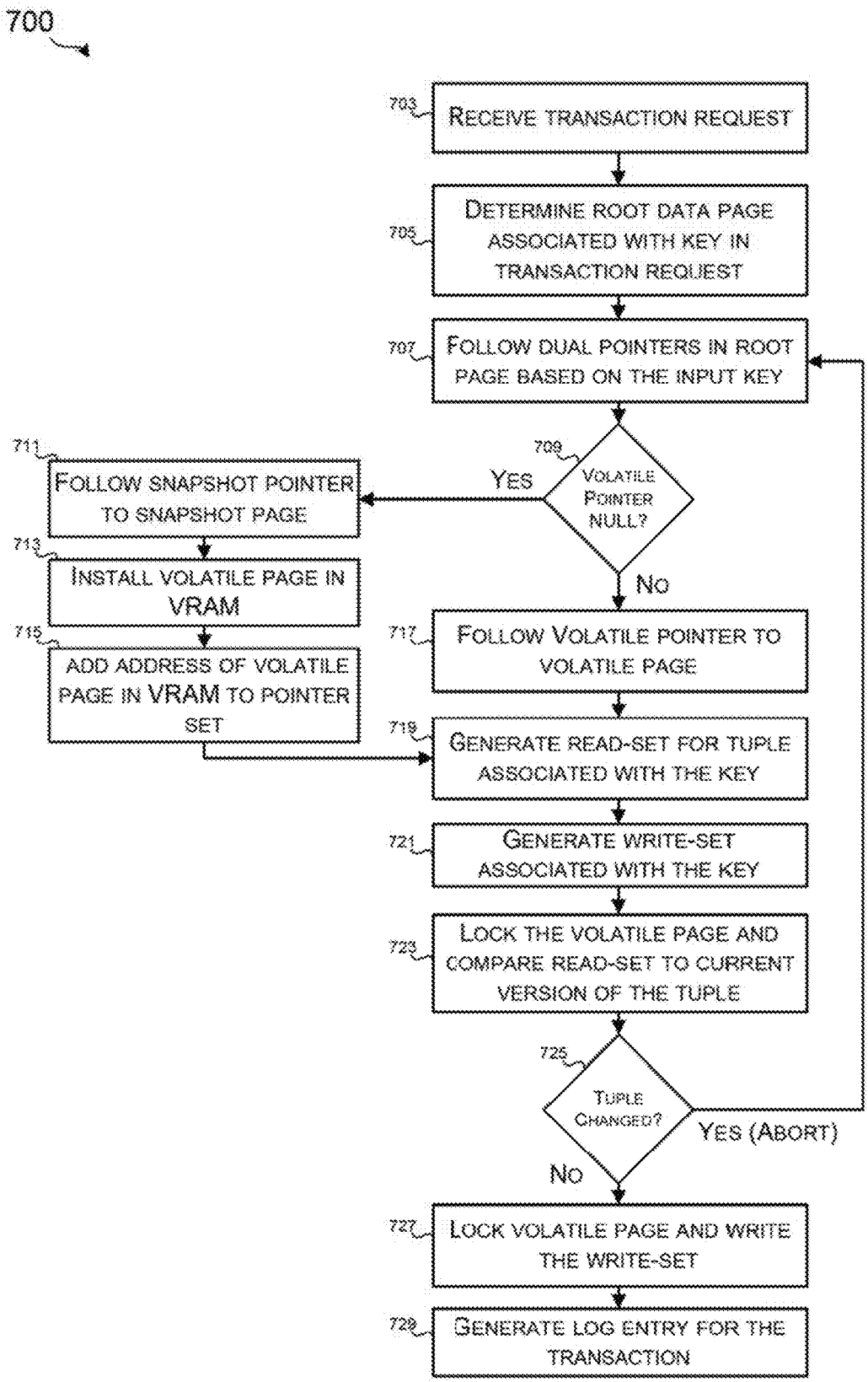
FIG. 7A is a flowchart of an example method for accessing data stored in volatile data pages.

FIG. 7A is a flowchart of a method 700 for executing a transaction according to various implementations of the present disclosure. Method 700 can begin at box 703 in which the DBMS 100 can receive a transaction request. The transaction request can be received from a user, such as a client computing device, a client application, an external transaction, or other operation performed by the DBMS 100. Such transaction requests can include information regarding the data on which the transaction should operate. For example, the transaction request can include an input key corresponding to a particular tuple. In related implementations, the transaction request can include an identifier associated with a particular storage.

In some implementations, the DBMS 100 can assign the execution of the transaction to a particular processor core 25. In such implementations, the selection of a particular core 25 can be based on predetermined or dynamically determined load-balancing techniques.

At box 705, the DBMS 100 can determine a root data page associated with the input key. To determine the root data page, the DBMS 100 can refer to a metadata file that includes a pointers to the root pages of multiple storages. The metadata file can be organized by key-value ranges, storage identifiers, or the like.

Once the root data page is located, the DBMS 100 can follow the dual pointers 250 in the root page based on the input key, at box 707. Each of the dual pointers 250 can include volatile pointer 251 and/or a snapshot pointer 253. The volatile pointer 251 can include a physical address of a volatile page 35 in VRAM 30 or a "NULL" value. The snapshot pointer 253 can include a physical address of a snapshot page 45 in NVRAM 40 or a "NULL" value. At determination 709, the DBMS 100 can determine whether or not the volatile pointer 251 is NULL. If the volatile pointer 251 is NULL, then the DBMS 100 can follow the snapshot pointer 253 to the corresponding snapshot page 45 in NVRAM 40, at box 711. At box, 713, the DBMS 100 can copy the snapshot page 45 to install a corresponding volatile data page 35 in VRAM 30. To track the location of the newly installed volatile page 35, the DBMS 100 can add the physical address in VRAM 30 to a pointer-set specific to the transaction, at box 715. The pointer-set can be used for verification of the tuple in the volatile data page 35 during a pre-commit phase of the transaction and abort the transaction if there has been a change to the tuple.

If, at determination 709, the DBMS 100 determines that the volatile pointer is not null, then at box 717 the system can follow the volatile pointer to the volatile page 45 in VRAM 30. From box 715 or 717, the DBMS can generate a read set for the tuple associated with the input key, at box 719. As described herein, the read set can include a version number, such as a TID, that the DBMS 100 can use to verify the particular version of the tuple. In some implementations, the read set can also include the actual tuple associated with the input key.

Based on the tuple, and/or other data, associated with the input key, the DBMS 100 can generate a write-set at box 721. For example, the write-set can include a new value for the tuple and a new TID. The write-set can be the result of a transaction that includes operations that change the tuple associated with the key-value in some way.

At box 723, the DBMS 100 can begin a precommit phase in which you can lock the volatile page 35 and compare the read-set to the TID and/or tuple in the volatile data page 35. At determination 725, the DBMS 100 can analyze the comparison of the read-set to the current version of the tuple to determine if there been any changes to the tuple. If there have been changes to the tuple, then DBMS 100 can abort the current transaction and reattempted by returning to box 707. At box 727 if there have been no changes to the tuple, then the DBMS 100 can lock the volatile data page 35 and write the write-set to the volatile data page 35.

At box 729, the DBMS 100 can generate a log entry corresponding to the transaction. As described herein, log entry can include information regarding the original transaction request, the original input key, and any other information pertinent to the execution of the transaction. In some implementations, generating the log entry can include pushing the log entry into a core specific private log buffer 225. The log entry can remain in the core specific private log buffer 225 until is processed by the log writer 265.

Figure 7B:
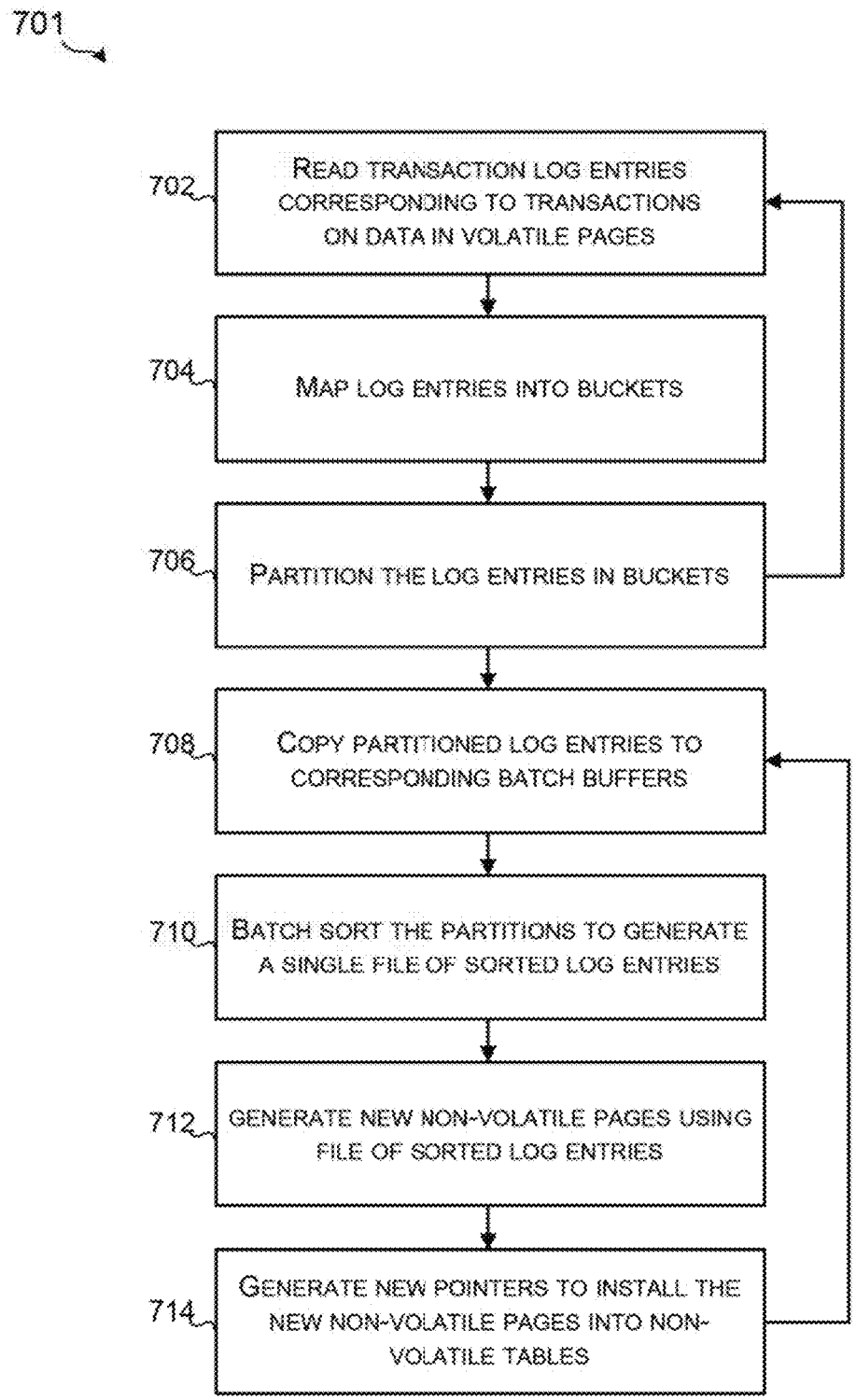
FIG. 7B is a flowchart of an example method for generating snapshot data pages.

FIG. 7B is a flowchart of a method 701 for processing log entries from multiple cores 25 in multiple nodes 20 to generate a partitioned stratified snapshot 270. Method 701 can begin at box 702, in which the DBMS 100 can read transaction log entries corresponding to transactions on data in the volatile pages 35. In some implementations, the transaction log entries are read from log files 267 that include transaction log entries from all the cores 25 in a particular node 20. Accordingly, the transaction log files 267 can be node specific.

At box 704, the DBMS 100 can map the log entries from the log files 267 into buckets or buffers 273 according to key ranges or storage identifiers. In some implementations, mapping the log entries from the log files 267 into the buckets 273 can be performed in a distributed mapper process 111.

At box 706, the DBMS 100 can partition the log entries in the buckets 273 according to various organizational methods. In one implementation, the partitions can be determined based on time period or epoch. Boxes 702 through 706 can then be repeated to process additional log entries corresponding to transactions subsequently executed by the DBMS 100.

Once the log entries are organized according to partition, the DBMS 100 can copy the partitioned log entries into the corresponding batch buffers 115, at box 708. At box 710, the partitions of tog entries can be batch sorted to generate a single file of sorted log entries. At box 712, the DBMS 100 can generate a new nonvolatile data pages 45 based on the file of sorted tog entries in the NVRAM 40. Each of the new nonvolatile data pages 45 can have a corresponding physical address in the NVRAM 40.

At box 714, the DBMS 100 can generate new pointers to the physical addresses of the nonvolatile data pages 45. The new pointers can replace the old pointers in the existing parent nonvolatile data pages 45. Thus, pointers that use to point to old nonvolatile data pages 45 can be updated to point to the new nonvolatile data pages 45. As described herein, the old nonvolatile data pages 45 are immutable and remain in NVRAM 40 until they are physically or logically deleted to reclaim the data storage space. Boxes 708 through 714 can be repeated as more log entries are partitioned into the buckets 278.

Snapshot Cache

Figure 8A:
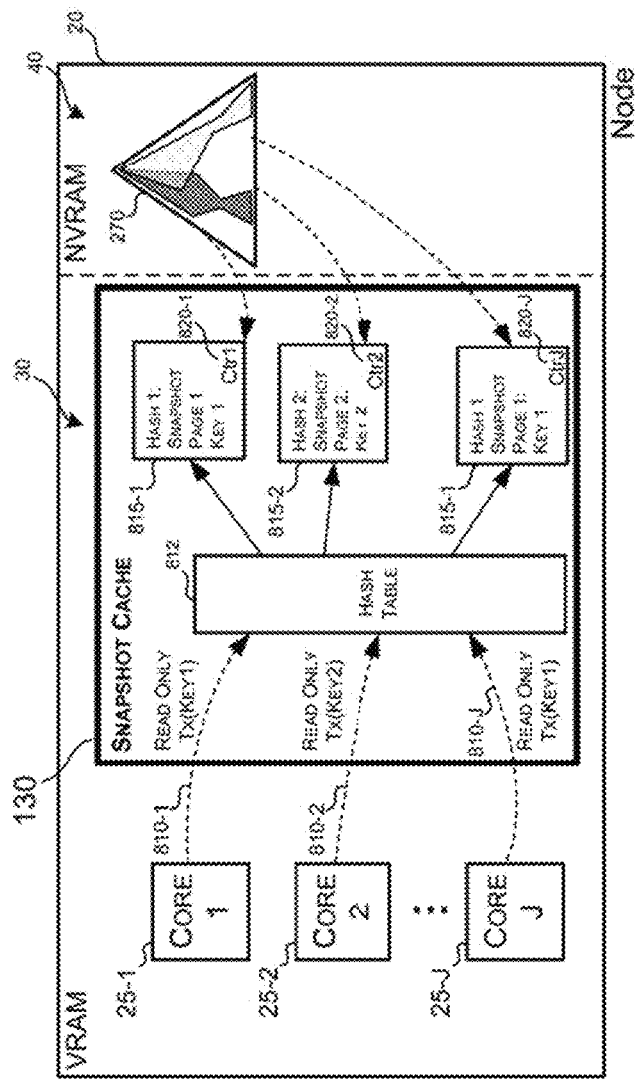
FIG. 8A illustrates an example lightweight, nearly wait-free snapshot cache.

Read-only transactions do not result in changes or updates to the data in the DBMS 100. Accordingly, to avoid the computational overhead and potential delays associated with retrieving data from snapshot data pages 45, various implementations of the present disclosure can include a read-only snapshot cache 130. One example snapshot cache 130 can include a scalable lightweight and buffer pool for read-only snapshot data pages 45 for use in transaction key-value stores in multi-processor computing systems with hybrid VRAM 30/NVRAM 40 storage. The data flow in and example snapshot cache 130 is depicted in FIG. 8A. While the technique for using the snapshot cache 130 is described in reference to the use of the hash table 812, snapshot cache 130 may also be applied to other caching mechanisms for similar read-only data structures.

The snapshot cache 130 can include a buffer pool. In general a buffer pool can provide useful functionality to the DBMS 100 in which it used. For example, a buffer pool can be used to cache the data secondary storage data pages to avoid input/output accesses to the secondary memory (e.g., the NVRAM 40), and thus increase the performance and speed of the system.

As illustrated, the snapshot cache 130 can include a hash table 812. When the snapshot cache 130 receives a read-only transaction 810, it can convert the key included in the transaction to a hash tag using the hash table 812. The corresponding snapshot page 815 can be retrieved from the stratified snapshot 270 and associated with the hash tag. In some implementations, the snapshot page 815 can be associated with a counter 820. The counter 820 can be incremented or decremented after some period of lime or number of transactions. When the counter 820 of a particular snapshot page 815 in the snapshot cache 130 reaches a threshold count (e.g., zero for counters that are decremented, or a predetermined counter value for counters that are incremented), the snapshot page 815 can be ejected from the snapshot cache 130. In this way, snapshot pages 815 that have not recently been use can be ejected from the snapshot cache 130 to make room for other snapshot pages 815.

In most instances, when another read-only transaction 810 requests a key, the snapshot cache 130 can determine whether a copy of the snapshot page 815 associated with that key is already resident in the snapshot cache based on the hash table 812. If the snapshot page 815 associated with a particular key exist in the snapshot cache 130, then tuples from the snapshot page 815 can be quickly read if however, the snapshot page 815 associated with the key is not already resident in the snapshot cache 130, the corresponding snapshot data pages 45 can be retrieved from the stratified snapshot 270 and associated with the key in an appropriate hash location.

In some implementations, data can transferred from NVRAM 40 to the snapshot cache 130 in blocks of fixed size, called cache lines. Accordingly, snapshot pages 815 can be used as the cache lines. When a cache line is copied from NVRAM 40 into the snapshot cache 130, a cache entry can be created. The cache entry can include the snapshot data page 815 as well as the requested memory location (e.g., the hash tag).

When a read-only transaction 810 needs to read a snapshot data page 45 associated with a particular key from the NVRAM 40, it can first check for a corresponding entry in the snapshot cache 130. The transaction 810 generates the hash tag corresponding to the key and checks for the snapshot page 815 associated with the hash tag. If the transaction 810 finds the matching snapshot page 815 in the snapshot cache 130, a cache hit has occurred. However, if the transaction 810 does not find a matching snapshot page 815 in the snapshot cache 130, a cache miss has occurred. In the case of a cache hit, the transaction can immediately reads the data in the cache line. In the case of a cache miss, the snapshot cache can allocate a new entry and copies in the appropriate snapshot data page 815 from the NVRAM 40. The transaction 810 can then be completed using the contents of the snapshot cache 130.

Example hash tables can include a hopscotch hashing scheme. Hopscotch hashing is a scheme for resolving hash collisions of values of hash functions in a table using open addressing and is well suited for implementing a concurrent hash table. The term "hopscotch hashing" is descriptive of the sequence of hops that characterize the scheme used to insert values into the hash table. In some examples, the hashing uses a single array of n buckets. Each bucket has neighborhood of consecutive buckets. Each neighborhood includes a small collection of nearby consecutive buckets (e.g., buckets with indexes close to the original hash bucket). A desired property of the neighborhood is that the cost of finding an item in the buckets of the neighborhood is close to the cost of finding it in the bucket itself (for example, by having buckets in the neighborhood fall within the same cache line). The size of the neighborhood can be sufficient to accommodate a logarithmic number of items in the worst case (e.g., it must accommodate log(n) items), and a constant number on average. If some bucket neighborhood is filled, the table can be resized.

In hopscotch hashing a given value can be inserted-into and found-in the neighborhood of its hashed bucket, to other words, it will always be found either in its original hashed array entry, or to one of the next H-1 neighboring entries. H could, for example, be 32, the standard machine word size. The neighborhood is thus a "virtual" bucket that has fixed size and overlaps with the next H-1 buckets. To speed the search, each bucket (array entry) includes a "hop-information" word, an H-bit bitmap that indicates which of the next H-1 entries contain items that hashed to the current entry's virtual bucket. In this way, an item can be found quickly by looking at the word to see which entries belong to the bucket, and then scanning through the constant number of entries (most modern processors support special bit manipulation operations that make the lookup in the "hop-information" bitmap very fast).

In various implementations, hopscotch hashing "moves the empty slot towards the desired bucket". This distinguishes it from linear probing which leaves the empty slot where it was found, possibly far away from the original bucket, or from cuckoo hashing that, in order to create a free bucket, moves an item out of one of the desired buckets in the target arrays, and only then tries to find the displaced item a new place.

To remove an item from the hash table, it can be simply removed from the table entry. If the neighborhood buckets are cache aligned, then they can be reorganized so that items are moved into the now vacant location in order to improve alignment.

In one implementation, the snapshot cache 130 can exploit the immutability of the snapshot data pages 45. Because the snapshot data pages 45 and the corresponding data pages 815 in the snapshot cache 130 are write-once and read-many, the snapshot cache 130 need not handle dirty data pages. Avoiding the need to handle dirty data pages allows for the operation of the snapshot cache 130 to be simple and fast. In addition, the snapshot cache 130 is tolerant of various anomalies that could cause serious issues in other databases.

The snapshot cache 130 of the present disclosure can tolerate an occasional cache miss of previously buffered data page 815 when a transaction requests the data page. The corresponding snapshot data page 815 can simply be read again. Such occasional misses do not violate correctness nor affect performance.

The buffered version of a snapshot data page 815 does not have to be unique in the snapshot cache 130. In the snapshot cache 130 of the present disclosure it is okay to occasionally have two or more images of the same data page. The consumption of VRAM 30 is negligible.

In one implementation, the consumption is structured as a hash table 812. The keys of the hash table 812 can include data page IDs (e.g., snapshot ID plus data page offset) and offsets in memory pool.

The hash table of FIG. 8A can be a hopscotch hash table, as described above, that uses cache lines. Searches of the hash table according to the present disclosure can use a single cache line read even when the snapshot cache 130 is moderately full. The original hopscotch scheme described above has non-trivial complexity and computational overhead to make it useful in a multi-processor system. However, the full complexity of the hopscotch hashing can be avoided in various implementations of the present disclosure. For example, implementations do not take any locks. Instead, only a small number of (e.g., one) of atomic operations can be used for inserts and none are necessary for queries. In one implementation, read-only transactions can only set memory fences.

The "hop" scheme for insertion into the snapshot cache 130 of the present disclosure can be set to only reattempt the insertion a fixed number of times (e.g., only once). For example, whenever a CAS fails, the system can try the next bucket, thus limiting the maximum number of steps to a constant. The insertion scheme can also limit the number of hops. If the number of required hops is more than a predetermined number, then the new entry can be inserted into a random neighboring bucket. While this can cause a cache-miss later, there will be no violation of correctness. As such, the snapshot cache 130 is wait-free and lock-free, such that it can scale to a multi-processor system 10 with little to no degradation of performance. This can improve the simplicity and speed of the other bufferpool schemes.

Figure 8B:
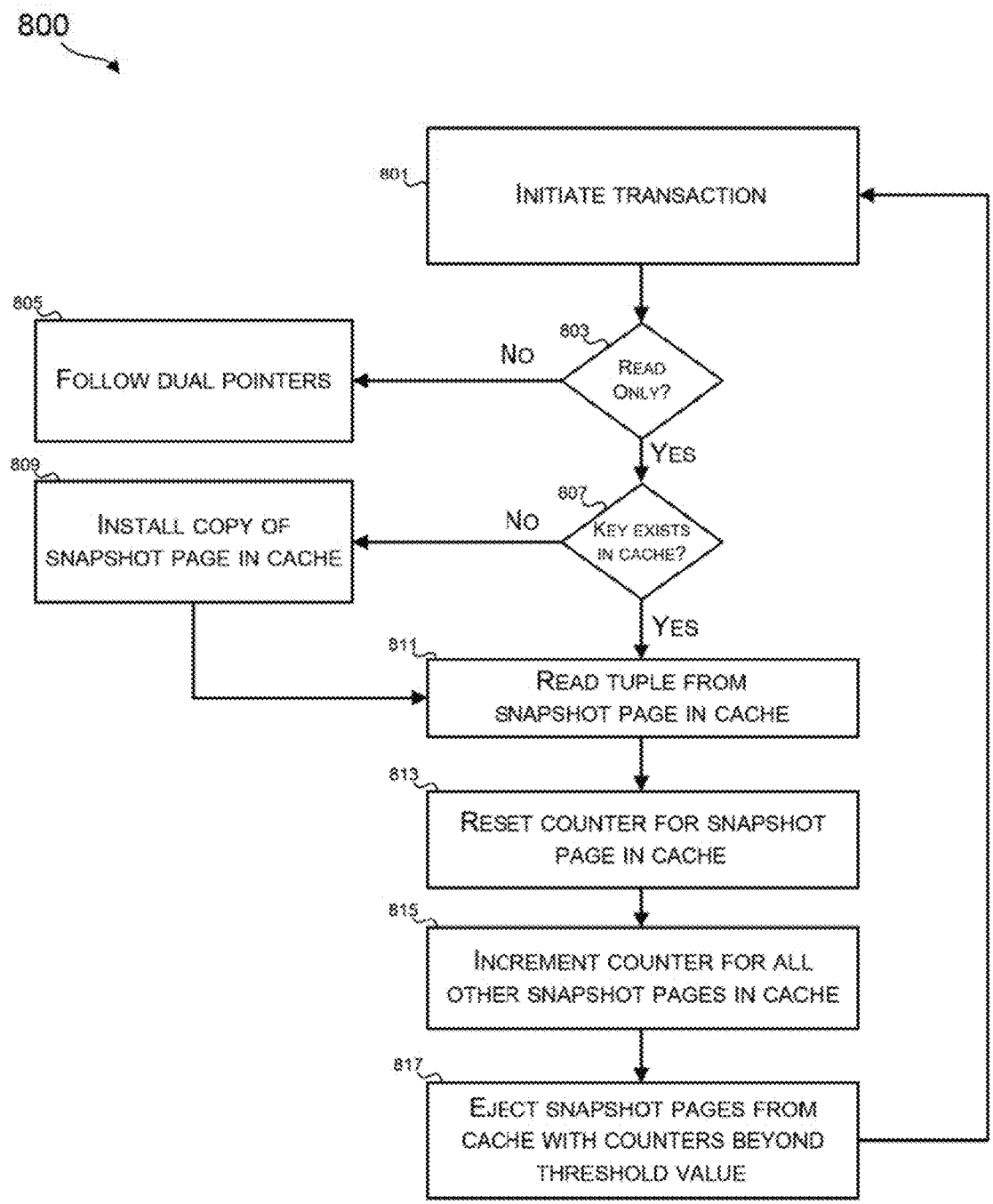
FIG. 8B is flowchart of an example method for a lightweight, nearly wait-free snapshot cache.

FIG. 8B is a flowchart of a method 800 for executing a transaction using a snapshot cache 130. Method 830 can begin at box 801, in which the DBMS 100 can initiate a transaction. At determination 803, the DBMS 100 can determine whether the transaction is a read-only transaction, it the transaction is not a read-only transaction, then the DBMS 100 can find the root page associated with the key of the transaction and follow the dual pointers 250 to find the target tuple, at box 805. At this point, the DBMS 100 can execute the transaction using various other implementations of the present disclosure.

If however, at determination 803, the DBMS 100 determines that the transaction is a read-only transaction, then at box 807 the DBMS 100 can check to see if the key exists in the snapshot cache 130. Checking to see if the key exists in the snapshot cache 130 can include generating a hash value based on the input key of the transaction, and checking to see if a data page associate with a hash value exists. If at determination 807, the DBMS 100 determines the key does not exist in the snapshot cache 130, then it can install a copy of the snapshot page 45 associated with the key in the snapshot cache 130, and box 809. Installing the copy of the snapshot page 45 into the snapshot cache 130 can include accessing the snapshot pages 270 to retrieve a copy of the snapshot page 45 and associate it with a hash value based on the key.

Once the DBMS 100 determines that the key already exists in the snapshot cache 130 at determination 807, or after the DBMS 100 installs a copy of the snapshot data page 45 associated with the key copy at box 809, then the DBMS 100 can read tuple associated with the key from the copy of the snapshot data page 45 in the snapshot page cache 130, at box 811.

At box 813, the DBMS 100 can set or reset a counter in the snapshot data page 45 to indicate a recent access of the snapshot data page. For example, the counter can include setting an integer value of a maximum number of snapshot page cache 130 accesses or an expiration time. Accordingly, the counter can be incremented or decremented according to the number of times the snapshot cache 130 is accessed or based on some duration of time.

At box 815, the DBMS 100 can increment the counter for snapshot data page 45 stored in the snapshot cache 130. As described herein, the counter can be incremented whenever the snapshot cache 130 is accessed or based on a running clock. In related implementations, the DBMS 100 can increment a counter for other snapshot data pages 45 in the snapshot cache 130. At box 817, the DBMS can eject snapshot pages 45 from the cash with counters that have expired or reached a threshold value (e.g., reached zero in a decrementing counter or a predetermined value in an incrementing counter). The method can begin again at counter 801 and actions described in boxes 803 through 817 can be repeated. In some implementations, box 801 can begin regardless of where DBMS 100 is in the process of implementing the actions in boxes 803 317. For example, DBMS 100, can initiate a new instance of method 800 while executing the previous instance of a method 800.

Data Structures

Various data structures have been referenced to describe example implementations of the present disclosure. For example, various implementations of the present disclosure can be fully realized using data structures in the dual memory configurations that include VRAM 30 and NVRAM 40. Specifically, significant improvements can be realized by DBMS 100 using data structures such as B-Tree Tree, Mass Tree, Foster B-Tree. and the like. However, additional improvements can be achieved by using one or more of the novel data structures described herein. Descriptions of such data structures are described in more detail below in reference to specific example. Some example data structures can include master-free, append/scan only heap, and serializable hash-index data structures. Each of these example data structures are described in detail in corresponding dedicated sections of the disclosure.

Master-Tree

As described herein, examples of the present disclosure can use various storage types, also referred to herein as data structures. One particular data structure, referred to herein as "master-tree" type data structure, can be useful in scenarios in which complex transactions are desired. The term master-tree is a portmanteau of the terms "mass tree" and "foster B-tree". The master-tree data structure 123 that can include a simple and high-performance OCC for use in systems similar to system 10. Master-tree can also provide strong invariance to simplify concurrency control and reduce aborts/retries. The master-tree data structure 123 can also be useful for transactions that need to access and process data records associated with ranges (e.g., customer purchase history for various ranges of products) can benefit from the use of dual data stored using the master-tree type data structure.

As described herein, the master-tree data structure 123 is a tree type data structure with characteristics and features that can efficiently support various other aspects of the present disclosure including, but not limited to, NVRAM 40 resident snapshot data pages 45 and OCC. For example, the master-tree 123 can support Key range accesses. Master-tree 123 can also include strong invariants to simplify the OCC protocols described herein and reduce aborts and retries. Master-tree data structures 123 can also include mechanisms for efficient snapshot cache 130

Master-tree type data structures can include a 64-bit B-tree where each layer is a B-tree optimized for 64-bit integer keys. Most key comparisons can be done as efficient 64-bit integer comparisons with only a few cache line fetches per data page that read layers further down when keys are longer than 64'bit. When a full data page is split, a read-copy-update (RCU) is performed to create the two new data pages with corresponding keys. The pointers from the parent data page can then be updated to point to the new data pages. To allow data page-in/out for volatile data pages 35 in the VRAM 30, example implementations can use foster B-tree type mechanisms. To data page-in/out into the main memory, various tree-type data structure can include handling multiple incoming pointers per data page, such as next/prev/parent pointers in addition to the pointers from parent data pages.

In a database with data page-in/out of main memory (e.g., VRAM 30), multiple incoming pointers may cause issues with concurrency control. Master-tree data structures can address such issues using foster-child type data page splits. In foster-child type data page splits, a tentative parent-child relationship is created and is subsequently de-linked when the real parent data page adopts the foster-child. Master-tree 123 can guarantee a single incoming pointer per data page with this approach and can then retire the old data page.

Master-tree 123 can also use system transactions for various physical operations. For example, inserting a new record can include executing a system transaction that physically inserts a logically deleted record of the key with sufficient body length and a user transaction that logically flips the deleted data page and installs the record. It is worth noting that system transactions are useful when used with logical logging, not physiological logging. Because a system transaction does nothing logically, it does not have to write out any log entries or invoke a log manager. A system transaction in implementations of the present disclosure can takes read-set/write-set and follow the same commit protocol as used in other transactions.

Implementations of the present disclosure can include lightweight in-page serializable concurrency control in databases that use dynamic tree data structures (e.g., master-trees, B-trees, etc.) in which the size of data pages is uniform (e.g., 8 KB), and the data pages can be evicted from VRAM 30. In such implementations, per-record/per-tuple garbage collection is unnecessary.

Some DBMS use out-of-page lock managers, others use some form of in-page concurrency control. Out-of-page central lock managers lock logical data entries in the data pages. Such systems work even if the data page is evicted because there is no locking mechanism in the data page itself. However, out-of-page lock managers do not scale well because of the associated high computational and memory overhead resulting from the use of complex CPU caches.

Implementations of the present disclosure instead use in-page locking mechanisms and concurrency control that can be scaled and used in multi-processor systems 10 with huge VRAM 30 and even larger NVRAM 40. In-page locking can scale orders of magnitude better in scenarios in which locking would be the main bottleneck, as is encountered in contemporary multi-processer computing systems.

Figure 9A:
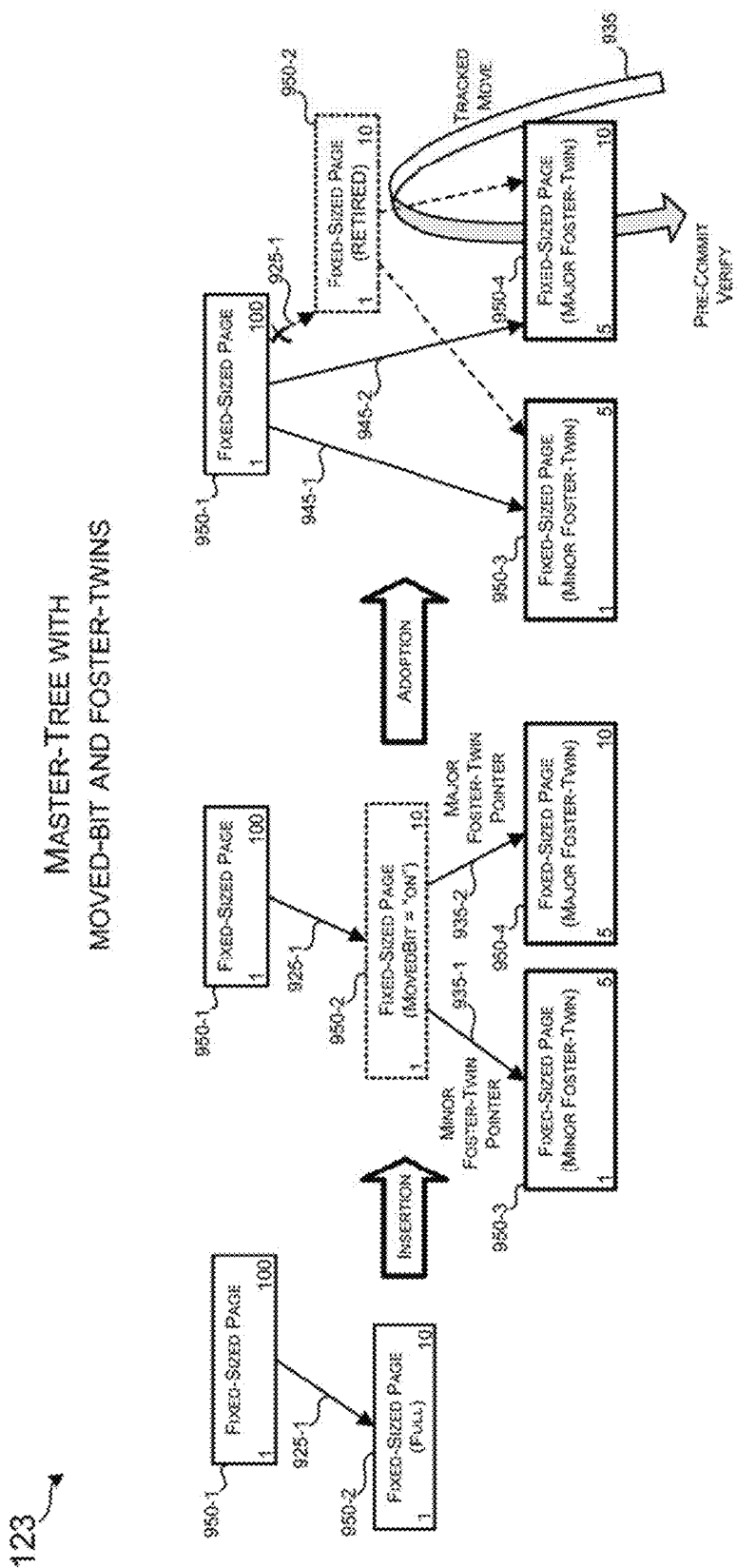
FIG. 9A illustrates an example of a master-tree data structure with moved-bits and foster-twins according to the present disclosure.

In-page locking mechanisms used in various implementations of the present disclosure use a foster-twin mechanism rather than a foster-child mechanism used in come contemporary systems. FIG. 9A illustrates an example of an insertion and adoption using moved-bits and foster-twins, according to implementations of the present disclosure.

As shown, a storage can include one parent fixed size data page 950-1 and one child fixed size data page 950-2. The relationship can be determined by a pointer in the parent 950-1 that points to the child 950-2. Because the data pages 950 are fixed size, when the child 950-2 is full, an attempt to perform an insertion can cause the child 950-2 to split.

When the child 950-2 splits, the TIDs of all records in the child 950-2 can be marked as "moved" and two foster children, or "foster-twin", data pages can be created. Foster-twins can include a minor (or left) foster child 950-3 and major (right) foster child 950-4. The minor foster child 950-3 can include the first half of keys after the split (e.g., 1 to 5), white the major foster child 950-4 can include the second half (e.g., 5 to 10). The major foster child 950-4 is analogous to the foster child in a foster B-tree type data structure, while the minor foster child 950-3 can be a fresh-new copy of the old child data page 950-2, before or after compaction.

At the beginning of the split, the old child data page 950-2 can be marked as "moved", which indicates that the old child data page 950-2 is not available for subsequent modifications. In one example, marking the old child data page 950-2 as moved can include setting an in-page moved bit to "ON". During the next traversal of the data structure, the parent data page 950-1 of the old, or "moved", data page 950-2 can find the new foster-twin data page 950-3 an 950-4 based on the new pointers 935-1 and 935-2 in the old child data page 950-2. The parent data page 950-1 can then adopt the major foster child 950-4. To adopt have the parent data page 950-1 adopt the major foster child 950-4, the DMBS can change the pointer 925-1 to the old child data page 950-2 to point to the minor foster child 950-3 and mark the old child data page 950-2 as "retired". This can induce installing pointers 945-1 and 945-2 in the parent 950-1 pointing to the same physical location of minor foster child 950-3 and major foster child 950-4 that pointers 935-1 and 935-2 did.

The pointer 925-1 from the parent 950-1 to the old child 950-2 can be physically or logically deleted from the parent 950-1.

In various implementations, the master-tree type data structure 123 can be limited to one incoming pointer per data page 950, thus there can be no reference to the retired data pages (e.g., old child 950-2) except from concurrent transactions. During respective pre-commit verify phases 935 of any concurrent transactions, the DBMS 100 can note the "moved" indication in the records and track the re-located records in the foster-minor or foster-major children 950-3 and 950-4.

The following Example 2 illustrates a pre-commit protocol that can be used with the foster-twin mechanism in various implementations of the present disclosure.

EXAMPLE 2

Input: R: Read-set, W: Write-set, P: Pointer set
/* Precommit-lock-phase */
while until all locks are acquired do
  foreach w ∈ W do if w.tid.is-moved( ) then w.tid
  track-moved(w.data page, w.record)
  Sort W by unique order;
  foreach w ∈ W do Try lock w. If we fail and find
  that w.tid.is-moved( ), release all locks and retry
end
Fences, get commit epoch;
/* Precommit-verify-phase */
foreach r; observed ∈ R do
if r.tid.is-moved( ) then r.tid
track-moved(r.data page, r.record)
if r.tid ≠ observed and r ∈ W then abort;
end
foreach p ∈ P do if p:volatile-ptr ≠ null then abort;
Generate TID, apply W, and publish log;

The above Example 2 illustrates a commit protocol according to various example implementations. In contrast to Example 1, the new location of a TID is determined using the foster-twin chain when the "moved bit" is observed. The tracking can be performed without locking to avoid deadlocks. The records can then be sorted by address and corresponding locks can be set. In the case in which the split becomes stale, concurrent transactions can split the child page data page 950-2 again, thus moving the TIDs again. In such cases, all locks are released and the locking protocol can be reattempted.

The use of foster-twins in implementations that use tree type data structures can ensure that that every snapshot data page 45 has a stable key-range for its entire life. Regardless of splits, moves, or retirement, a snapshot data page 45 can be a valid data page pointing to precisely the same set of records via foster-twins. Thus, even if concurrent transactions use moved or even retired data pages, it is not necessary to retry from the root of the tree as is the case in mass tree and foster B-tree type data structures.

This property can simplify the OCC described herein. In particular, there is no need for hand-over-hand verification protocols or split-counter protocols for interior data pages as there is in mass tree. Using master-tree, the system can search the tree by simply reading a data page pointer, and following it without placing memory fences. The DBMS 100 can just check the key-range, which can be immutable metadata corresponding to the data page, and locally retry in the data page if it does not match.

Such simplification not only improves scalability by eliminating retries and fences but also makes use of master-tree type data structures 123 more a maintainable non-blocking data structure. Non-blocking schemes are more scalable in many processor implementations, however overly complex non-blocking methods that use various atomic operations and memory fences can be error-prone and difficult to implement, debug, test, or evaluate correctness. Most non-blocking schemes often contain bugs that are only realized after a few years of database use. Thus, making the commit protocols process simple and robust is beneficial for building real database systems. Finally, we point out that the idea of foster-twins can be used in other dynamic tree data structures.

Figure 9B:
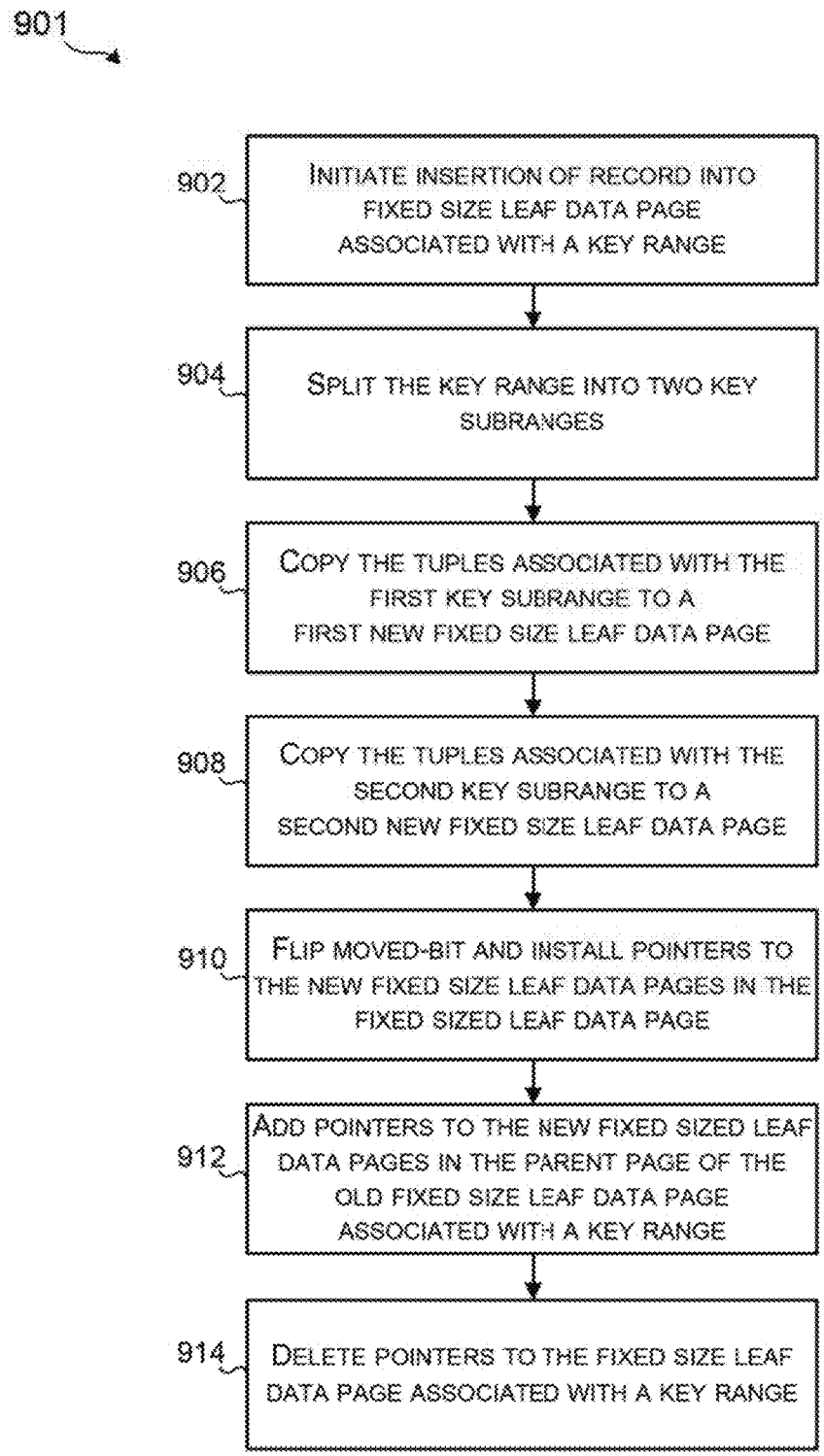
FIG. 9B is flowchart of a method for inserting a data page into a data structure using moved bits and foster-twins, according to the present disclosure.

FIG. 9B is a flowchart of a method 900 for inserting a new key or data record into a master-free type data structure by splitting a data page using moved-bits and foster twins. Method 900 can begin at box 902, in which the DBMS 100 can initiate an insertion of a record into a fixed size leaf data page associated with the key range. In some scenarios, the fixed size leaf data page may be too full to accommodate the insertion of a new key and associated tuple.

Accordingly, at box 904, the DBMS 100 can split the key range into two key subranges. The two key subranges can be equal or unequal foster twin key sub ranges.

At box 906, the DBMS 100 can copy the tuples from the original fixed size leaf data page associated with keys in the first of the key subranges to a new fixed size leaf data page, or "minor foster twin". The new fixed size leaf data page can be associated with the first of the key subranges. At box 908, the DBMS 100 can copy the tuples associated with the second key subrange to another new fixed size leaf data page, or "major foster twin". The second new fixed size leaf data page can then be associated with the second of the key subranges.

At box 910, the DBMS can flip a moved-bit and install pointers to the new fixed size leaf data pages in the old fixed size leaf data page. Flipping the moved-bit can include writing an appropriate bit to the old fixed size leaf data page. Installing pointers to the new fixed size leaf data pages can include writing the address of each of the new fixed sized the data pages or other indication of the physical location in the memory to the old fixed size data page. The pointers can also be associated with the key subranges of the two new fixed size leaf data pages.

At box 912, the pointers to the new fixed size leaf data pages can be added to the parent data page of the old fixed size leaf data page and associated with the corresponding key subranges. Accordingly, the parent data page of the old fixed size leaf data page can adopt the minor foster twin and the major foster twin by deleting the pointers to the old fixed size leaf data page associated with the original key range, at box 914.

Serializable Hash Index

In various implementations, the data structure can include a serializable hash index that is scalable for use in multi-processor systems with large VRAM 30 and huge NVRAM 40 arrays (e.g., computing system 10). The hash index data structure can be used to organize the both volatile data pages 35 and snapshot data pages 45. In some implementations, the hash index can allows use of different implementations of OCC.

Figure 10A:
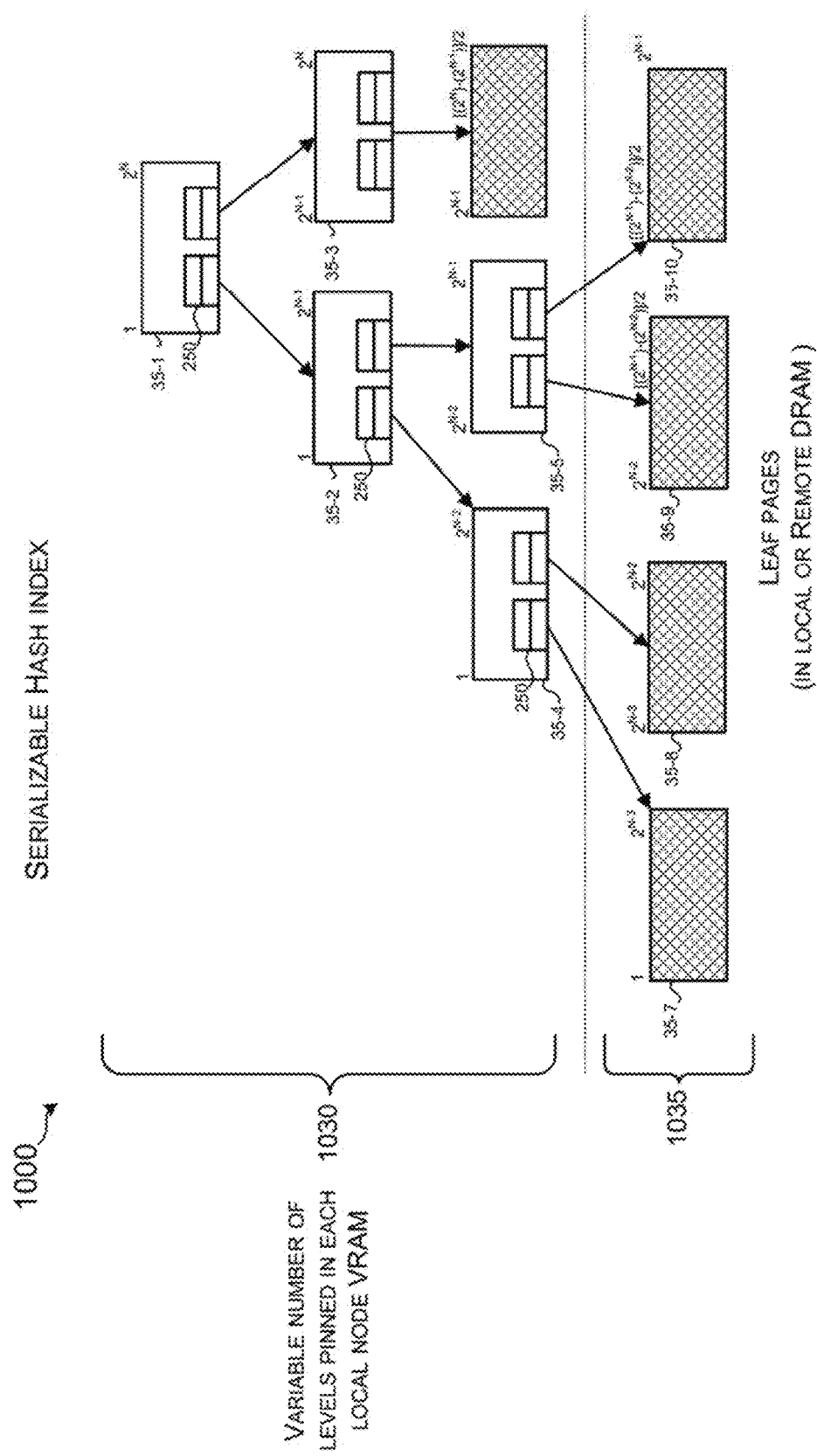
FIG. 10A illustrates an example hash index data structure according to the present disclosure.

FIG. 10A depicts an example serializable hash index 1000. As shown the example hash index 1000 can be in the form of a tree-type data structure of dual pointer 250s in VRAM 30. In some implementations, the hash index 1000 can include a fixed size number of layers or levels. While reference is made to volatile pages 35 to illustrate various aspects of the serializable hash index 1000, it should be noted that the hash index can also be viewed from the perspective of snapshot data pages 45 in the NVRAM 40. The dual pointers 250 described herein can point to data pages in either the VRAM 30 or NVRAM 40, as described herein.

As illustrated in the example serializable hash index 1000, the node volatile data pages 35, such as volatile data page 35-2, 35-3, 35-4, 35-5, and 35-6, can include dual pointers 250 that point to volatile data pages 35 and/or snapshot data pages 45 data that are associated with specific collections of hash values (e.g., hash buckets of hash values). In such implementations, the hash values can be based on the input key included in a transaction or transaction request.

In some examples, the root page 35-1 and/or the node pages may only include the dual pointers 250 that ultimately lead to the leaf pages. In such implementations, the leaf pages, such as 35-6, 35-7, 35-8, 35-9, and 35-10 can include the data (e.g., tuples, values, or data records) associated with the key and the hash value. Accordingly, it may be unnecessary for the leaf pages to include dual pointers 250 because they may contain the key for which a transaction is searching.

A variable number of upper-level data pages 1030 can be pinned, or declared that they always exist as volatile data pages 35 in VRAM 30. Accordingly, all of the dual pointers 250 in the higher level volatile data pages 35 1030 can be immutable up to the level between levels 1030 and 1035. As such, the higher level data pages 130 can be installed in the VRAM 30 of each node 20 in the system. Accordingly, data pages in the upper level 1030 can thus be used as snapshot cache 130.

In the example shown in FIG. 10A, with all but the last level 1035 installed in the node local VRAM 30, the DBMS 100 may need only perform at most one remote node 20 data access for each data access in a transaction. Because this can consume a fixed amount of VRAM 30 (e.g., memory required to maintain the snapshot cache), the number of levels pinned in VRAM 30 can be variable (e.g., based on user input or the specifications of the computing system).

Figure 10B:
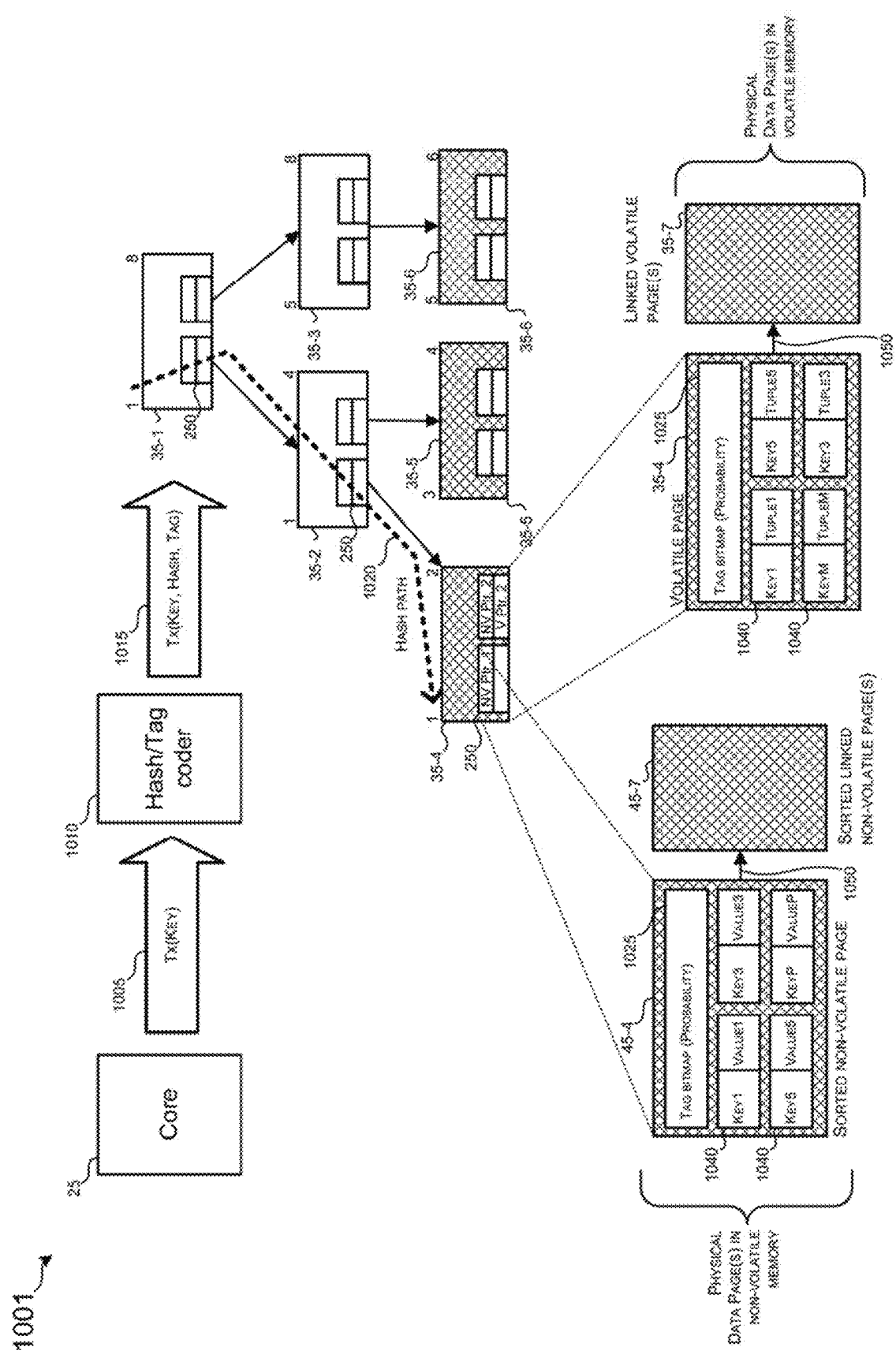
FIG. 10B depicts an example of search and insert in a hash index data structure according to the present disclosure.

FIG. 10B illustrates an example data flow 1001 for using the serializable hash index 1000. When a core 25 initiates a transaction 1005 it can include indications of an operation and a key corresponding to the data on which the operation should act. A hash/tag coder can generate a hash value and/or a tag value based on the key. The core 25 can then execute the transaction 1015 that includes the key, the hash value, and the tag value.

To execute the transaction 1015, the serializable hash index can be searched according to the hash value. For example, if the hash value is "1", men the search for the key designated in transaction 1015 can execute by following the hash path 1020 through dual pointers 250 in volatile pages 35-1 and 35-2 that point to volatile page 35-4 (or its equivalent in the snapshot data pages 45) that contains the hash bucket in which hash value "1" is contained.

Each leaf data page to which the dual pointers 250 point can include contiguous compact tags of all physical records in the leaf data page so a transaction can efficiently locate whether/where a specific tuple probably exists with one cache line. In the particular example shown, the leaf page 35-4 can include a tag bitmap 1025 that can indicate a probability that the key is located in the volatile data page 35-4. For example, if the tag value generated based on the input key of the transaction is not in the tag bitmap 1025, then the input key is definitely not contained in volatile data page 35-4. However, if the tag value is included in the tag bitmap 1025 then there is a chance (e.g., probability>0), that the input key is included in the leaf volatile page 35-4.

The transaction can then search the volatile data page 35-4 for the corresponding tuple based on the key. In case there are more data records in the hash bin than a particular leaf data page can hold, the leaf data page can be associated a linked data page that is equal to or larger than the capacity of the leaf data page. In such implementations, the leaf data page can store a "next-data page pointer" that links it to another data page. As such, additional data records in the hash bin can then be stored in the linked data page and share the hash index and tag table of the original data page.

For example, if the data contained associated with the hash bin in the volatile data page 35-4 to be larger than the space available in the volatile data page 35-4, then the DBMS 100 can install a pointer 1050 that can point to the location of a linked volatile data page 35-7. The linked volatile data page 35-7 can include another pointer that points to another linked volatile data. As such, the linked volatile data pages 35 can be chained together to further increase the capacity of leaf data page 35-4. As the last linked volatile data page is filled, another page can be added and a corresponding pointer can be installed in the preceding linked page.

In related implementations, the dual pointer 250 in leaf volatile page 35-4 can also include a snapshot pointer that points to the snapshot data page 45-4. Similar to the configuration described the key can be found (or not found) using the tag bitmap 1025 and keys in the snapshot data page 45-4. As above the leaf snapshot data page 45-4 (e.g., non-volatile data page) can be expanded by adding link pointers 1050 that point to linked snapshot data pages 45-7.

Various example implementations that use a serializable hash index can include efficient and scalable concurrency control for use a multi-processor hybrid memory computing system 10. In one example implementation, to insert a new record with a new associated key, the concurrency control can include a system transaction that scans through hash path 1020 of node data pages to a leaf page and its linked chain of linked data pages to confirm that there is no physical record (deleted or not) in the chain that is associated with the new key.

If no identical key is found in the chain, then the system can perform a single compare-and-swap (CAS) operation in the last linked data page of the chain to reserve space for the new record that is to be associated with the new key. If the CAS fails, the DBMS 100 system can read the newly inserted record with spinlocks on TID (until it is marked valid). If the inserted key is not same as the new key, the system can try again. If the CAS succeeds, the system can store the key and tag and then set TID to the system transaction TID with valid and deleted flags. Execution of user transaction can then try to flip the deleted flag and fill in the payload of the data record associated with the key using a commit protocol.

To delete an existing key, the system can simply find the data record and logically delete it using the commit protocol. In some implementations, logically deleting a data record can include simply inserting or flipping a deleted flag.

To update the payload of the data record associated with the key with larger data than original, such that the record must be expanded, the existing key does not need to be deleted. Instead, a marker can be inserted into the existing payload that points the search to another key, referred to herein as a "dummy key", inserted to the chain.

Use of the hash index descried herein can ensure that a physical record's key is immutable once it is created. As such, the count of physical records can be set to only increases and the count of physical records in all but the last data pages of the chain is immutable.

As with the other data structures of the present disclosure, records stored. In the hash index table described herein can be defragmented and compacted (e.g., skipping logically deleted records) during snapshot construction. The unit of logical equivalence in the snapshot/volatile data page duality is the pointer to the first data page.

The partitioning policy associated with each data page can be determined based on the number of records in the chain that have TIDs issued by specific cores 25 or SoCs in corresponding nodes 20. Thus, if the majority of the records stored in a chain of data pages are associated with TIDs issued by a particular SoC, then that chain can be stored in the partition of the snapshot data pages 45 resident in the NVRAM 40 of the particular node 20. As such, the hash index data page structure and data page hierarchy allows static hash buckets to be stored in snapshots, thus more fully utilizing the capacity of huge NVRAM 40 array 40.

Furthermore, the cache line-friendly data page layout of the hash table index table can increase the performance of the DBMS system 100 in finding a particular data record (e.g., a tuple). The node 20-aware partition helps locate the data records in each hash bucket in the node 20 that uses them the most, thus reducing the number of remote NVRAM 40 accesses necessary to retrieve specific data. The concurrency control protocol minimizes read-set/write-set and makes almost all operations lock-free except the last precommit, which is inherently blocking.

Figure 10C:
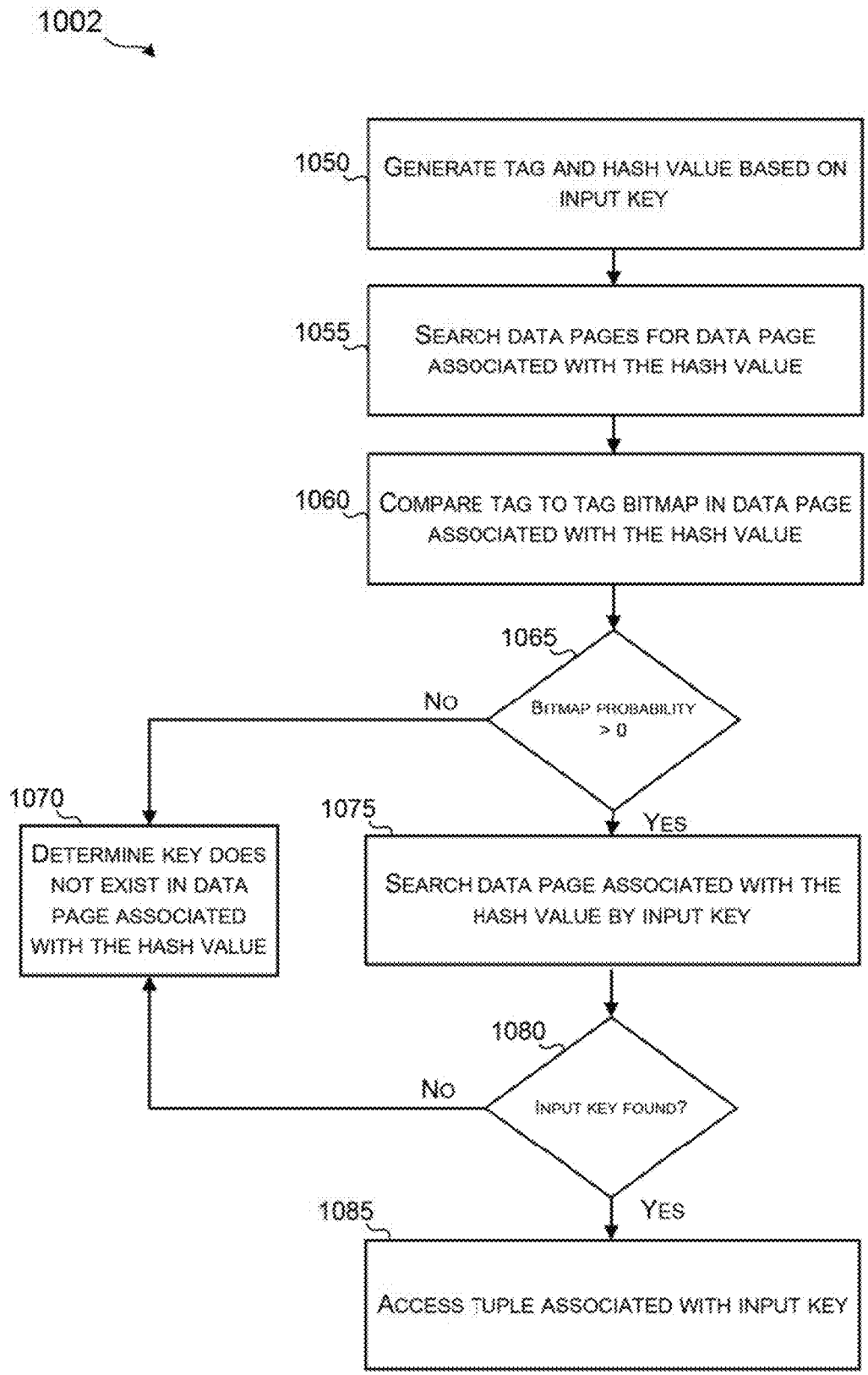
FIG. 10C is flowchart of a method for inserting a data page into a hash index data structure, according to the present disclosure.

FIG. 10C is a flowchart of a method 1002 for using a serializable hash index for executing a transaction in a multicore computing system 10 according to various example implementations of the present disclosure Method 1002 can begin at box 1050 in which the DBMS can generate a tag and they hash value based on an input key of an associated transaction. Generating the tag and the hash value can include executing a tag generating routine and/or executing a hash value generating routine.

At box 1055, DBMS 100 can search data pages in a storage for data page associated with the hash value. In one example implementation, searching the data pages in the storage can include traversing the hierarchical structure (e.g. a tree-type structure) of data pages associated with various ranges of hash values. Once a data page associated with the hash value is found, the DBMS 100 can compare the tag with a tag bitmap 1025 in the data page, at box 1060.

In various implementations, the tag bitmap 1025 can include probability scores that the key on which the tag is based might be found in the data page. Accordingly, at determination of 1065, the DBMS 100 can compare the bitmap probability to determine whether the key probably exists in the data page. If the probability indicated in the tag bitmap 1025 indicates a zero probability, then the DBMS 100 can determine that the key does not exist in the data page associated with the hash value, at box 1070.

Based on zero probability in the tag bitmap, implementations of the present disclosure can positively determine that the key does not exist in the storage. However, if the bitmap probability is greater than zero that the key exists in the data page, then the DBMS 100 can search the data page associated with the hash value by the input key to find the target tuple. However, because the tag bitmap 1025 can return false positives, but not false negatives, the DBMS 100 can determine whether the key associated with the tag and/or the hash value is found in data page, at determination 1060.

If the key associated with the tag and/or hash value is not found in the data page at determination 1080, then the DBMS 100 can determine that the key does not exist in the storage, at box 1070. However, if the DBMS 100 can determine that the input key exists in the data page associated with, then the DBMS 100 can access the triple associated with the input key in the data page, at box 1085.

While the above description of method 1002 as described in reference to generic data pages, the method can be implemented in storages in VRAM 30 and NVRAM 40 using corresponding volatile data pages 35 and the snapshot data pages 45.

Append and Scan Only Heap Data Structure

Some contemporary database management systems include heap data structures (e.g., Microsoft™ SQL Server). However, such systems usually also assume general accesses, such as read via secondary index. As a result their scalability is limited in multi-core environments like computing system 10.

In the lock-free programming, there are several lock-free linked-list data structures that can scale better, however, such structures do not provide serializability or capability to handle NVRAM 40-resident data pages (e.g., snapshot data pages 45). In addition, most of, if not all, contemporary database management system are not optimized for epoch-based OCC or provide for inter node 20 data accesses.

Figure 11A:
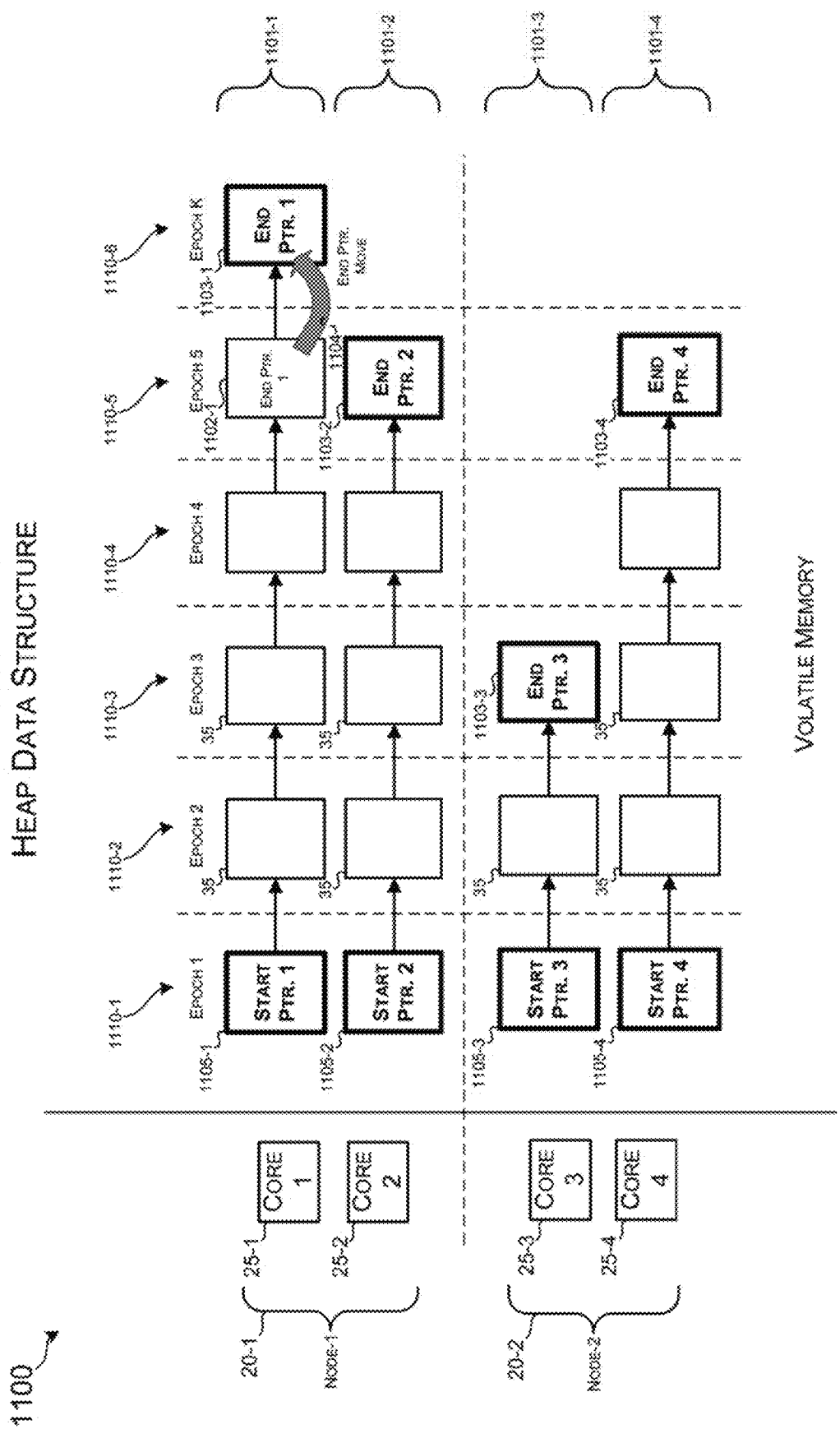
FIG. 11A depicts an example scan/append only heap data structure according to the present disclosure.

Implementations of the present disclosure can include a heap data structure that can maintain a thread-local (e.g. node local) singly linked list of volatile data pages 35 for each thread (e.g., each core 25). Beginning with a start or head data page in the linked list, each data page in the linked list can include a pointer to the location of the next data page in the linked list. Such implementations can be useful when logging large amounts of sequential data, such as logging electronic key card secure access door entries, incoming telephone calls, highway FIG. 11A illustrates example of the heap data structure 1100 that can include multiple linked lists 1101 of volatile data pages 35. The heap data structure 1100 can include one linked list 1101 for each core 25. The beginning of the each linked list 1101 is designated by a start pointer 1105 inserted into a volatile data page 35 in the list. The start pointer 1105 can be moved to limit the amount of space used in VRAM 30 as portions of the linked list 1101 are moved to NVRAM 40 during snapshots.

Each core 25 can append new key-value pairs (e.g., data records or tuples) to the end of the linked list 1101 of pages 35 without synchronizing the entire linked list. In the example shown, new data records can be added to the last data page 1103. Accordingly, the heap data structures of the present disclosure can guarantee the serialization order of the records in each linked list 1101. Each core 25 can ensure that one volatile data page 35 does not contain records from multiple epochs. When one epoch 1110 ends and another begins (e.g., the epoch switches), each core 25 can add a next data page 35 even if the current data page 35 is empty or almost empty. Adding a last data page 1103 can include moving an end pointer 1104 from the previous last page 1102 to the new last page 1103. Due to the inherent serial order of the heap data structure 1100, it is welt suited for creating log entries and log files corresponding to transactions performed on volatile data pages 35 organized according various data structures described herein.

Figure 11B:
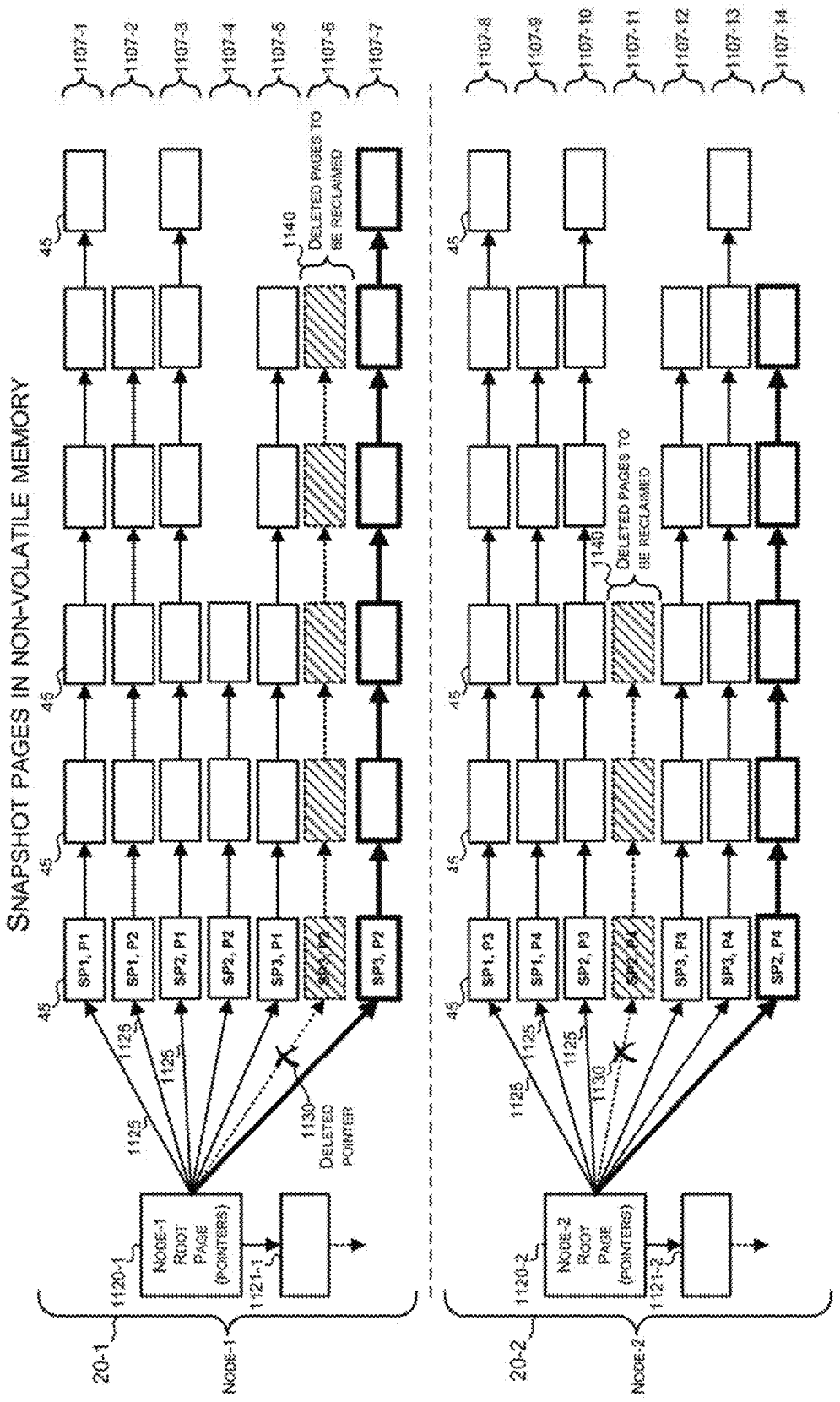
FIG. 11B depicts an example of a scan/read in a heap data structure in volatile memory.

Snapshot versions of the heap data structure can be constructed locally in a local NVRAM 40 on a corresponding node 20. FIG. 11B illustrates an example of the local log entries from each log file placed sequentially into linked lists 1107 snapshot data pages 45. After each snapshot is taken, new root pointers 1125 can be added to a metadata file 1120 that point to a head snapshot data pages 45 of a corresponding linked list 1107. If the metadata the 1120 gets filled, additional overflow metadata files 1121 can be added by installing a pointer to the metadata file 1120 or a preceding overflow metadata file 1121 pointing to the new overflow metadata file 1121. Accordingly, the list of root page pointers 1125 can include a linked list of pointers that include the original metadata file 1120 and additional overflow metadata files 1121.

Referring back to FIG. 11A, when the DBMS 100 drops volatile data pages 35 after a snapshot is taken, it can utilize the fact that each volatile linked list 1101 is sorted in the serialization order and each volatile data page 35 contains only one epoch 1110. The DBMS 100 can read each volatile data page 35 from the head data page 1105. If the epoch 1110 of the head data page 1105 is earlier than or same as the epoch of the epoch of the head snapshot data page of the corresponding list of 1107 in NVRAM 40, the start pointer 1105 can be moved to the next volatile data page 35. The memory space of the previous head volatile data page 35 can then be reclaimed. To reclaim memory space in the NVRAM 40, the pointer 1125 of the head snapshot data page 45 of the linked list 1107 can be deleted. For example, the deleted pointers 1130 in FIG. 11B allows for deleted pages 1140 of linked lists 1107-6 and 1107-11 to be reclaimed.

Snapshots of the heap data structure 1100 can be read without any synchronization. However, the structure still provides concurrency control for volatile data pages 35.

Figure 11C:
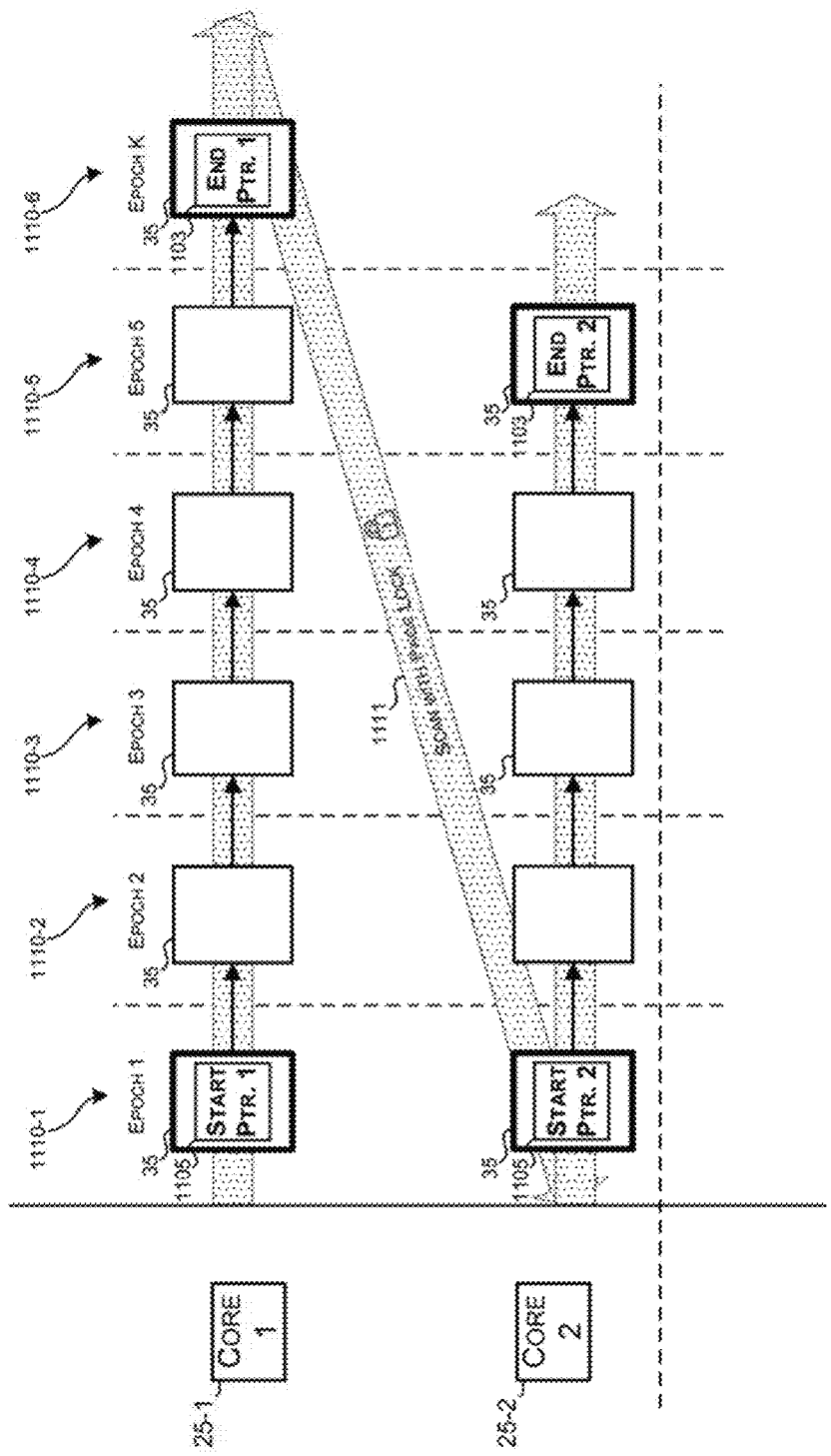
FIG. 11C depicts an example of snapshot data page construction in scan/append only heap data structure.

FIG. 11C depicts a scanning transaction 1111 for reading the data in the snapshot storage that uses a heap data structure, according to various embodiments of the present disclosure. In the example shown, the scanning transaction 1111 in serializable isolation level can take a table lock at the beginning of the read scan. To enable concurrency control, the transaction can wait until all other threads have acknowledged the table lock or enter an idle state. The table lock thus prevents other transactions would append some records to the heap structure. Before adding a record, a transaction can check the table lock at the beginning of pre-commit phase. If a table lock exists on the target heap data structure, the transaction can abort. For transactions that are already in an apply-phase after commit, the scanning transaction 1111 can wait until those transactions are completed. A transaction can report its progress as a thread-local variable with appropriate fences. The scanning transaction 1111 can then read all records in the volatile data pages 35, releases the table lock, and records the address of the last volatile data page 35 and TID for the next record (e.g., the address at which the TID for next record will be placed), which can be verified at pre-commit phase. A scanning transaction in can also be performed in the snapshot data pages 45.

Some implementations can include a truncation operation. A truncation operation can represent a delete operation in the heap data structure of the present disclosure. The truncation operation can remove volatile data pages 35 from a head volatile data page 35 up to the epoch 1110 of a truncation point. For snapshot dais pages 45, deletion can include dropping the root pointers 1125 to linked lists with snapshot versions earlier than the truncation point. When a snapshot spans a truncation point (e.g., "delete records appended by epoch-3", and there is a snapshot that covers record from epoch-2 to epoch-4 the snapshot root pointer can be kept but those records can be skipped when snapshot data pages 45 are read.

The heap data structure requires only thread-local accesses with little synchronization. As such, the heap data structure can avoid almost all remote-node accesses, either in VRAM 30 or NVRAM 40.

Figure 11D:
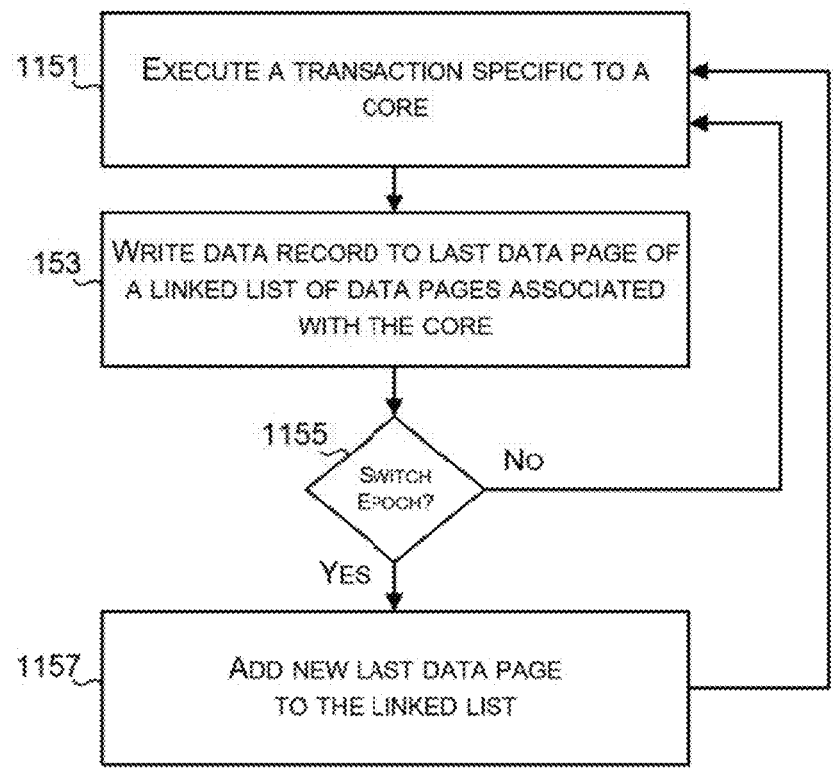
FIG. 11D is flowchart of a method for writing data records to a scan/append only data structure, according to the present disclosure.

FIG. 11D is a flowchart of a method 1150 for adding data records corresponding to transactions executed by a core 25 to a heap data structure 1100. At box 1151, using a particular core 25 in a multi-core computing system 10 the DBMS 100 can execute a transaction. The transaction can include any type of operation and can result in data being generated. In example implementations, the transaction can include the operations that include the detection of an event, such as a security door access, a file access, or other monitored event.

At box 153 the core 25 can write a data record to the last data page in a linked list of data pages associate with the core 25. Before writing to the last data page, the DBMS can check to see if any other cores 25 or other transactions have placed a table lock. If the table lock is in place, then the transaction can be aborted and reattempted. If no table lock is in effect, then the DBMS can proceed with writing the data records.

To find the linked list of data pages associated with the core 25, the DBMS 100 can reference a metadata fie that includes pointers to the head page and end page of the linked list associated with the core 25. Based on the pointer to the end page of the associated linked list, the core 25 can find the location of the end page and insert the data record and/or an associated TID specific to the transaction.

At determination 1155, the DBMS 100 can check to see if the epoch has switched (e.g., a time period has elapsed or a predetermined number of transactions have been executed). If the epoch has switched, then the DBMS can add a new last data page to the linked list associated with the core 25. In some examples, the DBMS 100 can add a last data page to all linked list in the storage. Alternatively, the DBMS 100 may only add a new last page to linked lists in the storage that have been added a new data record in the last epoch.

At determination 1155, if the DBMS 100 determines that the epoch has not switched, then a new transaction can be executed and the resulting data record can be added to the current last page in boxes 1151 to 1153.

Figure 11E:
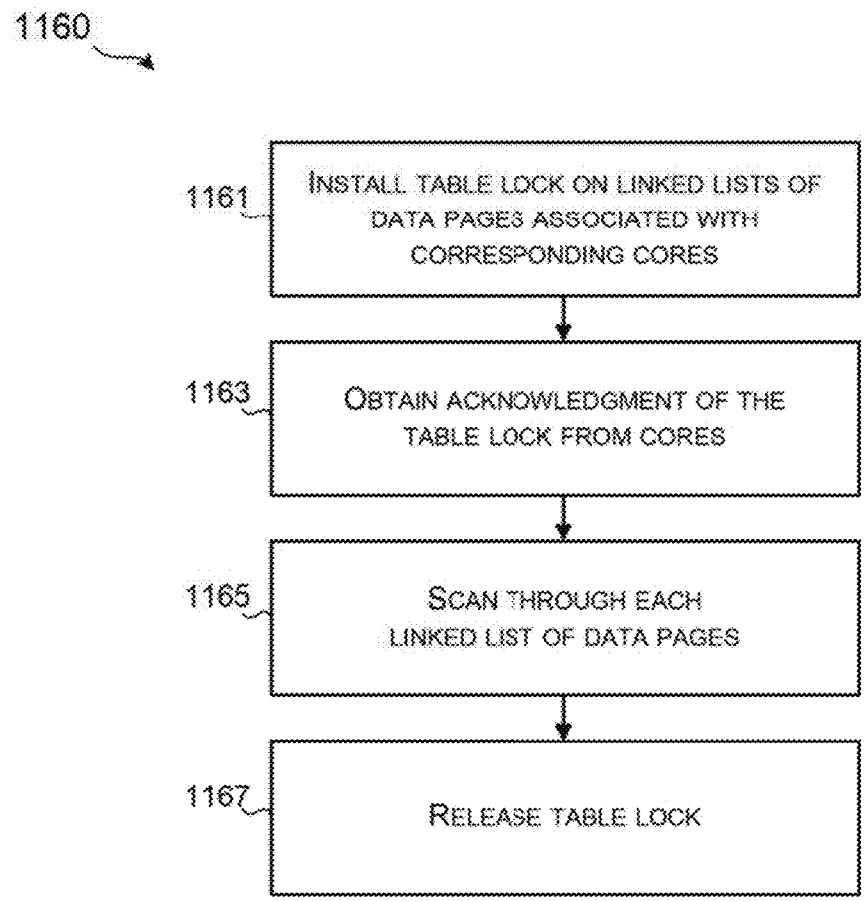
FIG. 11E is flowchart of a method scanning data records in a scan/append only data structure, according to the present disclosure.

FIG. 11E is a flowchart of a method for reading data from the heap data structure 1100, according to an example implementation of the present disclosure. At box 1161, the DBMS 100 can install a table lock on a set of linked lists of data pages. The set of linked lists can be part of storage for a data relating to a specific function or operation. Each linked list in the set can be associated with a core 25 in a computing system 10 and stored in VRAM 30 or NVRAM 40 on the same node 20 as the core 25.

At box 1163, the DBMS 100 can obtain acknowledgement of the table lock from each core 25 associated with the set of linked lists. Alternatively, the DBMS 100 can wait until all cores have entered an idle state. In some implementations, the DBMS 100 can wait for all cores associated with the set to stop or acknowledge the table to avoid the possibility that a data record will be added to one or more of the last data pages while the DBMS 100 is reading the other linked lists or data pages.

Once all core activity in the set has stopped or paused, the DBMS 100 can scan through each linked list in the set, at box 1165. In one example, the each of the linked list of data pages can be read from a start page to an end page, as designated by corresponding start pointers and end pointers inserted into the linked list. The order in which the linked lists are scanned can be based on an order included in a metadata file that lists the physical location of the root page for of the linked lists. In some examples, the order that the linked list are scanned can be based on the socket position (e.g., socket number) of the corresponding associated cores 25 in the computer system 10. When one complete linked list is scanned, then DBMS 100 can begin scanning the next linked list until the last data page in the last linked list is scanned.

At box 1167, the DBMS 100 can release the table lock. Once the table lock is released, transactions can resume and cores 25 can add data records to the last page of the corresponding linked lists.

According to the foregoing, examples disclosed herein enable network operators to implement or program a network using multiple controller modules that may have disparate policies and objectives regarding the configuration of the topology of the network. Conflicts between the policies and objectives, as represented by the differences in the resource allocation proposals, can be resolved using various election based decision mechanisms, thus allowing the network operator to realize the benefits of the policies and objectives of multiple independent controller modules.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

What is claimed is:

1. A method comprising:
generating a plurality of log files comprising log entries corresponding to transactions performed on data in volatile data pages organized into tables and stored in a volatile random access memory distributed across a plurality of interconnected nodes;
mapping the log entries into buckets corresponding to the tables;
partitioning the log entries in the buckets based on ranges of keys associated with the volatile data pages;
copying the partitioned log entries to corresponding batch buffers;
sorting the partitioned log entries in the batch buffers according to key ranges to generate corresponding files of sorted log entries;
generate new non-volatile data pages according to the files of sorted log entries; and
updating existing non-volatile data pages stored in a non-volatile random access memory distributed across the plurality of nodes with the new non-volatile data pages.

2. The method of claim 1, wherein the ranges of keys are associated with open or more of the plurality of interconnected nodes determined to frequently access volatile data pages or non-volatile data pages associated with the ranges of keys.

3. The method of claim 1, wherein updating the existing non-volatile data pages comprises updating pointers in the existing non-volatile data pages with addresses of the new non-volatile data pages.

4. The method of claim 1, wherein, once the transactions are committed, the plurality of log files are stored in a private log buffer specific to a processing core.

5. The method of claim 1, wherein a first set of the buckets are associated with a table of customer information and a second set of the buckets are associated with a database for financial transactions.

6. The method of claim 1, further comprising:
determining that a first bucket of the buckets is full;
sorting and partitioning a set of log entries in the first bucket; and
initiating a reducing process of the set of log entries in the first bucket.

7. The method of claim 6, wherein the sorting and partitioning is based on boundary keys associated with the first bucket.

8. The method of claim 1, further comprising:
reserving space in a buffer; and
copying a first bucket into the reserved space in the buffer.

9. The method of claim 8, wherein the space is reserved in the buffer by atomically modifying a state of the buffer, and wherein the state is modified a second time upon copying the first bucket to the reserved space in the buffer.

10. The method of claim 8, wherein the first bucket is copied into the reserved space in the buffer using a single write operation.

11. The method of claim 1, wherein the log entries comprise information regarding an original transaction request and an original input key.

12. The method of claim 1, further comprising:
generating a single file of the sorted log entries.

13. A system comprising:
a plurality of processors;
a volatile random access memory coupled to at least one of the plurality of processors;
a non-volatile random access memory coupled to one or more of the plurality of processors, wherein the non-volatile random access memory comprises instructions, that when executed by one or more processors in the plurality of processors, cause the processors to:
generate a plurality of log files comprising log entries corresponding to transactions performed on data in volatile data pages organized into tables and stored in a volatile random access memory;
map the log entries into buckets corresponding to the tables;
partition the log entries in the buckets based on ranges of keys associated with the volatile data pages;
copy the partitioned log entries to corresponding batch buffers;
sort the partitioned log entries in the batch buffers according to key ranges to generate corresponding files of sorted log entries;
generate new non-volatile data pages according to the files of sorted log entries; and
update existing non-volatile data pages stored in a non-volatile random access memory distributed across the plurality of nodes with the new non-volatile data pages.

14. The system of claim 13, wherein the volatile random access memory is distributed across a plurality of interconnected nodes, and wherein the ranges of keys are associated with one or more of the plurality of interconnected nodes determined to frequently access volatile data pages or non-volatile data pages associated with the ranges of keys.

15. The system of claim 13, wherein updating the existing non-volatile data pages comprises updating pointers in the existing non-volatile data pages with addresses of the new non-volatile data pages.

16. The system of claim 13, wherein the processors are further caused to:
determine that a first bucket of the buckets is full;
sort and partition a set of log entries in the first bucket; and
initiate a reducing process of the set of log entries in the first bucket.

17. A non-transitory computer readable storage medium comprising instructions, that when executed by one or more processors in a plurality of processors distributed among a plurality of interconnected nodes, cause the processors to:
generate a plurality of log files comprising log entries corresponding to transactions performed on data in data pages organized into tables and stored in a random access memory distributed across a plurality of interconnected nodes;
map the log entries into buckets corresponding to the tables;
partition the log entries in the buckets based on ranges of keys associated with the data pages;
copy the partitioned log entries to corresponding batch buffers;
sort the partitioned log entries in the batch buffers according to key ranges to generate corresponding files of sorted log entries;
generate new data pages according to the files of sorted log entries; and
update existing data pages stored in a random access memory distributed across the plurality of nodes with the new data pages.

18. The non-transitory computer readable storage medium of claim 17, wherein the ranges of keys are associated with open or more of the plurality of interconnected nodes determined to frequently access volatile data pages or non-volatile data pages associated with the ranges of keys.

19. The non-transitory computer readable storage medium of claim 17, wherein updating the existing data pages comprises updating pointers in the existing data pages with addresses of the new data pages.

20. The non-transitory computer readable storage medium of claim 17, wherein the processors are further caused to:
determine that a first bucket of the buckets is full;
sort and partition a set of log entries in the first bucket; and
initiate a reducing process of the set of log entries in the first bucket.

* * * * *